US012654718B1

(12) United States Patent
Ye et al.

(10) Patent No.: US 12,654,718 B1
(45) Date of Patent: Jun. 16, 2026

(54) MACHINE-LEARNED MODEL ARCHITECTURE FOR PREDICTING FUTURE OBJECT TRAJECTORY

(71) Applicant: Zoox, Inc., Foster City, CA (US)

(72) Inventors: Zhefan Ye, Foster City, CA (US); Sri Nitchith Akula, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 47 days.

(21) Appl. No.: 18/444,103

(22) Filed: Feb. 16, 2024

(51) Int. Cl.
| | |
|---|---|
| *B60W 50/00* | (2006.01) |
| *B60W 60/00* | (2020.01) |
| *G06T 7/00* | (2017.01) |
| *G06T 7/20* | (2017.01) |
| *G06T 7/70* | (2017.01) |

(52) U.S. Cl.
CPC .... B60W 50/0097 (2013.01); B60W 60/0027 (2020.02); G06T 7/20 (2013.01); G06T 7/70 (2017.01); B60W 2554/4041 (2020.02); B60W 2554/4042 (2020.02); G06T 2207/20081 (2013.01); G06T 2207/30241 (2013.01); G06T 2207/30256 (2013.01)

(58) Field of Classification Search
CPC ......... B60W 50/0097; B60W 60/0027; B60W 2554/4041; B60W 2554/4042; G06T 7/70; G06T 7/20; G06T 2207/20081; G06T 2207/30241; G06T 2207/30256
USPC .......................................................... 701/27
See application file for complete search history.

(56) References Cited

U.S. PATENT DOCUMENTS

| | | | |
|---|---|---|---|
| 9,330,571 B2 * | 5/2016 | Ferguson .............. | B60W 30/16 |
| 10,882,416 B2 | 1/2021 | Koebler et al. | |
| 2020/0023842 A1 | 1/2020 | Gutierrez et al. | |
| 2021/0192234 A1 * | 6/2021 | Chen ...................... | G06V 20/58 |
| 2021/0381845 A1 | 12/2021 | Gokhale et al. | |
| 2022/0063620 A1 | 3/2022 | Zwicky et al. | |
| 2022/0076032 A1 * | 3/2022 | Jain ...................... | G06V 20/588 |
| 2022/0315051 A1 | 10/2022 | Patel et al. | |
| 2023/0041975 A1 | 2/2023 | Caldwell et al. | |
| 2023/0202471 A1 | 6/2023 | Yu et al. | |
| 2023/0249711 A1 | 8/2023 | Hardy et al. | |
| 2024/0174266 A1 * | 5/2024 | Pronovost ................ | G06N 5/01 |
| 2024/0253671 A1 | 8/2024 | Mahadevan et al. | |
| 2024/0289975 A1 * | 8/2024 | Viehauser .............. | G06F 3/011 |
| 2024/0355129 A1 | 10/2024 | Jo et al. | |

OTHER PUBLICATIONS

Office Action for U.S. Appl. No. 18/444,304, dated Jul. 3, 2025, 18 Pages.
Zhao et al. "Tnt: Target-driven trajectory prediction." In Conference on Robot Learning, pp. 895-904. PMLR, 2021.
Zhao et al., "TNT: Target-driveN Trajectory Prediction," Waymo LLC, Google Research, 12 pages.

\* cited by examiner

*Primary Examiner* — Tiffany P Young
(74) *Attorney, Agent, or Firm* — Lee & Hayes, P.C.

(57) ABSTRACT

Predicting a future trajectory of an object may comprise using a machine-learned model architecture to iteratively predict a series of predicted poses (positions and orientations) of the object over time. The machine-learned model may condition these predictions on a lane orientation of nearest target pose to a predicted pose or last predicted pose of the object.

19 Claims, 8 Drawing Sheets

400

DETERMINE, BASED AT LEAST IN PART ON SENSOR DATA, A TOP-DOWN REPRESENTATION OF AN ENVIRONMENT
402

RECEIVE A TRACK ASSOCIATED WITH AN OBJECT
404

DETERMINE, BY A FIRST MACHINE-LEARNED MODEL, A TARGET POSE FROM AMONG MULTIPLE TARGET POSES
408

A

VEHICLE 202

TRACK 406

TARGET POSE 412

TRACK 406

CURVED ROADWAY EXAMPLE 410

400

A

DETERMINE, BY A SECOND MACHINE-LEARNED MODEL BASED AT LEAST IN PART ON THE TARGET POSE, THE TRACK, AND AT LEAST A PORTION OF THE TOP-DOWN REPRESENTATION, A PREDICTED POSE OF THE OBJECT 414

500

CONTROL A VEHICLE BASED AT LEAST IN PART ON THE PREDICTED POSE AND/OR THE PREDICTED TRAJECTORY 422

ANGULAR OFFSET 420

PREDICTED POSE 416

POSITION OFFSET 418

TARGET POSE 412

MACHINE-LEARNED MODEL ARCHITECTURE FOR PREDICTING FUTURE OBJECT TRAJECTORY

BACKGROUND

In dense urban environments and other scenarios, the number of objects, both moving and stationary, that an autonomous vehicle detects may be high. For those objects in the environment capable of movement, predicting where these objects will be and what they will be doing in the future is critical for operating an autonomous vehicle safely and efficiently. Not only is this an enormously complex problem, it is difficult to accurately predict how an object will react to actions of the autonomous vehicle and even more difficult to predict rare behavior, like erratic movement, an object that moves out of turn according to rules of the road or that makes an illegal maneuver, or the like.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
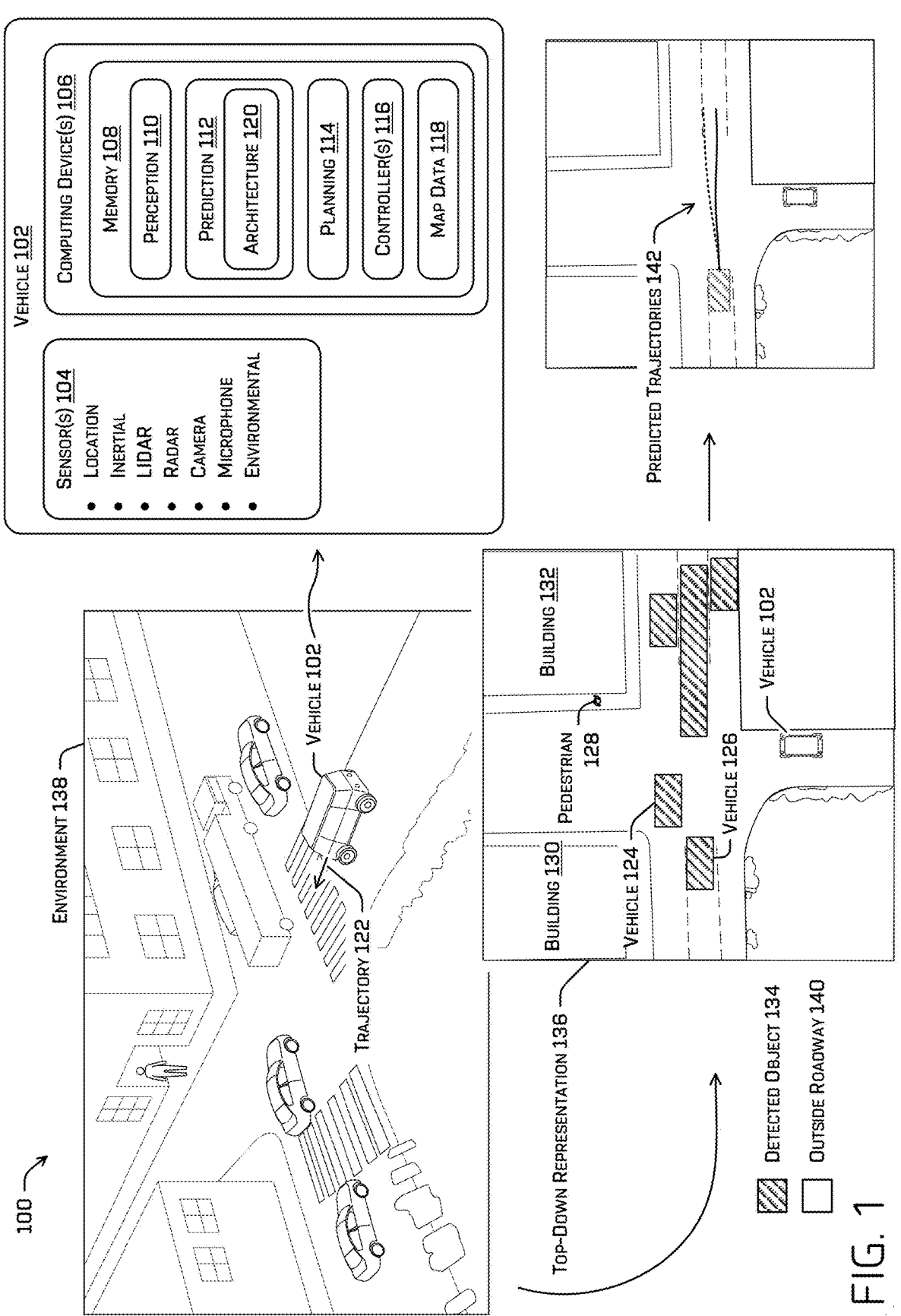
FIG. 1 illustrates an autonomous vehicle and an example scenario illustrating the prediction of an object trajectory prediction using the machine-learned model architecture discussed herein.

The techniques (e.g., hardware, software, machines, and/ or processes) discussed herein may include a machine learning model architecture that predicts a future state of an object, such as an object capable of movement, i.e., a dynamic object. For example, a vehicle may detect an object in the environment in which the vehicle is operating and the machine-learned model architecture may determine a predicted state of the object at a future time. A vehicle may use that predicted state of an object to control operations of the vehicle. Additionally or alternatively, the machine-learned model architecture may comprise a portion of the architecture that uses the predicted state of the object to determine a predicted trajectory of the object over time from a current time to a future time that is the same or further distant than the future time associated with the predicted state. The predicted trajectory may comprise a set of predicted states of the object from the current time to the future time or a continuous change in position and/or orientation of the object, for example. In an example where the predicted trajectory comprises a set of predicted states, the predicted states may be a sequence of predicted states associated with different times, and in an example where the predicted trajectory is continuous each portion of the predicted trajectory may be associated with a different time. In other words, the predicted trajectory may implicitly indicate a velocity and/or acceleration of the object although, in another example, the predicted states composing the predicted trajectory may be time agnostic and may merely identify estimated states of the object without regard to time.

To determine the predicted state of an object, the machine-learned model may use a first machine-learned component to determine a feature map of a top-down representation of the environment and determine a portion of the resultant feature map within a threshold distance around the object for which a predicted state is to be determined. The top-down representation used by the machine-learned model may be determined by receiving sensor data from one or more sensors and may determine a top-down representation of the environment, which may be a birds eye view image that encodes information associated with the environment such as a detected object in the environment and/or map data (e.g., which may indicate a roadway shape and extents, signage, static object(s), and/or the like), as discussed in U.S. Patent Application Pub. No. 2021/0181758, filed Jan. 30, 2020, the entirety of which is incorporated by reference herein for all purposes.

The machine-learned model architecture may determine the predicted pose using the portion of the feature map near (within a threshold distance of) a current position of the object, an encoded track associated with object, portion(s) of the feature map associated with the track, and an embedding generated by another machine-learned component using a graph representation of map data. The track may indicate a current and/or historical (e.g., over a previous time window to a time in the past) pose (i.e., position and orientation), velocity, acceleration, and/or other state of the object. In some examples, a machine-learned component may determine an embedding associated with the track. For example, an embedding may comprise a vector or tensor representing characteristics of the embedding in an embedding space where distance in the embedding space represents differentiation in characteristics of other tracks. The graph representation of the map data may indicate different roadway lanes as nodes in the graph and edges in the graph as relations between the lanes, such as connections via intersections, lanes for which a lane change would be legally permitted, and/or the like. Weights associated with these edges may be used to indicate a likelihood that an object transitions between lanes where such a likelihood may be determined by the regularity with which log data indicates that an object transitioned between the two lanes, whether or not the lane change was legal in order to capture aberrant object activity, animal actions, a pedestrian entering the roadway outside a crosswalk, normative activity, or the like.

In some examples, the machine-learned model architecture may use two stages to determine the predicted state of an object. In a first stage, the machine-learned model may determine, by classification machine-learned component(s), a likelihood (e.g., posterior probability) that the object will occupy a particular lane or intersection portion at a future time and a likelihood that the object will occupy a particular candidate pose, from among multiple candidate poses indicated in the map data. For example, the map data may indicate a plurality of candidate poses ("target poses") associated with each lane where each candidate pose indicates a position within a roadway such as a position along a lane at a lateral median or other lane reference or a position within an intersection, and an orientation that indicates a tangent of the lane or intersection at that position. At the first stage, after predicting determining a likelihood for up to all the lane(s) and/or intersection(s) in the environment within a threshold distance of the object or the vehicle and a likelihood for up to all the target poses within a threshold distance of the object or the vehicle, the architecture may multiply a target pose's likelihood by the likelihood determined for the lane or intersection in which the pose exists. The architecture may then determine the maximum likelihood that results from these multiplications and indicate the target pose associated with this maximum likelihood as the predicted target pose. This predicted target pose may indicate a preliminary estimate of the position and orientation the object will occupy at a future time (e.g., 3 seconds in the future, 5 seconds in the future, 8 seconds in the future, any other future time). In some examples, the architecture discussed herein may determine a more accurate predicted pose of an object.

In a second stage, the machine-learned model may determine, by regression machine-learned model component(s), offset(s) from the predicted target pose as the final predicted pose of the object at the future time. The offset(s) may comprise a lateral and/or longitudinal offset (e.g., distance) from the position indicated by the predicted target pose and/or an angular offset (e.g., an angle) from the orientation indicated by the predicted target pose. These offset(s) may be added to the position and/or orientation indicated by the predicted target pose to indicate the (final) predicted pose of the object at the future time.

In some examples, the machine-learned model architecture may further comprise a portion of the architecture that uses the predicted pose to determine a predicted trajectory the object will execute over a future time period. In some examples, the machine-learned model may use a current pose of the object, the track, and the predicted pose to iteratively determine a next pose in a set of poses from a current pose of the object up to or beyond the predicted pose. For example, the predicted pose generated by a first portion of the architecture may indicate a predicted pose of the object 6 seconds into the future and the predicted trajectory may indicate intervening predicted object poses at 0.5 second, 1 second, or 2 second intervals from a current pose of the vehicle up until 6 seconds into the future or beyond (e.g., 8 seconds into the future, 10 seconds into the future). Note that these time intervals and final times are only given as non-limiting examples and other times may be used. Accordingly, to give a non-limiting example where a 1-second interval is used, the second portion of the machine-learned model may generate an intervening predicted pose for 1 second into the future using the current pose of the object, the object's track, and the predicted pose output by the first portion of the machine-learned model; then the second portion of the machine-learned model may generate an intervening predicted pose at 2 seconds into the future using the intervening predicted pose at 1 second into the future, the object's track, and the predicted pose output by the first portion of the machine-learned model.

In some examples, to generate the predicted trajectory (e.g., the predicted pose(s) that make up a set of predicted poses composing the predicted trajectory) the second portion of the machine-learned model may further use an orientation indicated by a target pose determined by a machine-learned component (e.g., a multi-layer perceptron (MLP), a graph neural network (GNN)) of the first or second portion of the machine-learned model architecture. For example, this component may determine a coarse path from a current pose of the object through to a final time associated with an end of the predicted trajectory, whether that final time is equal to or later than the time associated with the predicted pose output by the first portion of the machine-learned model. In such an example, at an iteration of generating the predicted pose for a next time step, the architecture may determine a nearest target pose to the coarse path at the next predicted time and the machine-learned model may use an orientation of that target pose as input for generating the predicted pose at the next time step in addition to the inputs discussed above. The coarse path may be indicated as a series of poses in time, a series of poses without regard to time, a curve/line, or the like. In another example, instead of using the coarse path or in addition to using the coarse path, the first or second portion of the machine-learned model may comprise a machine-learned component (e.g., MLP, GNN) that may determine (e.g., as a classification task from among multiple target poses) an estimated target pose for a next time step. The second portion of the machine-learned model architecture may use an orientation indicated by this estimated target pose as an input in addition to the inputs discussed above to generate the predicted pose at the next time step.

Functionally, using this coarse path and/or using the estimated target pose to obtain an (intermediate) orientation additional to the orientations indicated by the current object pose and the predicted object pose may increase the accuracy of the resultant predicted trajectory. In some examples, a predicted trajectory generated by the machine-learned model architecture using this intermediate orientation may cause the resultant predicted trajectory to follow lanes or transition between lanes and intersections in a manner that is closer to average human driving. Additionally or alternatively, using this intermediate orientation may prevent the predicted trajectory from cutting corners, such as by predicting that an object will drive over a sidewalk, through a building, or at an unnaturally sharp angle through an intersection. In some examples, the improvements to the accuracy may be more slight. For example, the predicted trajectory may be less likely to drift into another lane over time/distance. Such a prediction error may be attributable to sensor noise, an underfitted model parameter, and/or the like, but may be remediated by using the intermediate orientation as part of generating the predicted trajectory.

In some examples, the machine-learned model architecture discussed herein may be used as part of predicting a state of the environment as part of a tree search responsive to a candidate trajectory for controlling the vehicle. The machine-learned model architecture may determine subsequent predicted trajectories for an object over subsequent time periods up to a time horizon as part of a tree search for determining a series of actions for controlling the vehicle where each time period is associated with a potentially different action for controlling the vehicle. In other words, the machine-learned model for determining the predicted trajectory may iteratively/progressively update (e.g., modify previously generated portions of) or concatenate new portions to the predicted trajectory as further candidate actions (in time or in distance) are determined for the vehicle.

For example, the tree search may iteratively determine different candidate actions as candidates for controlling the vehicle for each time period of a series of time periods. The machine-learned model may determine at least a portion of a predicted trajectory of the object based at least in part on such a candidate action and the tree search may select a first candidate action associated with a first time period to use to explore further candidate actions stemming from the first candidate action at a second time period. In some examples, the portion of the predicted trajectory may comprise a response of the object to the candidate action since some candidate actions for controlling the vehicle may affect an operation of the object. In some examples, a cost may be determined by a cost function for each candidate action based at least in part on the predicted trajectory of the object. The machine-learned model may update the predicted trajectory and/or add a new portion to the predicted trajectory of an object that was determined for the first candidate action based at least in part on one of the candidate actions determined for the second time step. The tree search may repeat this process until a time horizon, distance, or target pose is achieved by the tree search. The tree search may also account for objects classified by a machine-learned model as not being relevant to operation planning by the vehicle (e.g., the machine-learned model may have generated a likelihood of such object(s) changing their behavior responsive to a candidate action of the vehicle that is below a likelihood threshold), but may use a passive prediction for those objects. In some examples, the passive prediction may be determined by the tree search using a kinematics model or neural network. However, such a passive prediction would not be based on the candidate action(s) of the vehicle.

In some examples, training the machine-learned model architecture for determining a predicted pose and/or predicted trajectory of an object may include determining a loss (e.g., Huber loss, Cauchy loss, L1 or L2 loss) based on a difference between a ground truth pose and/or trajectory that the object was observed as taking (e.g., based on sensor data) and a predicted trajectory and/or predicted pose generated by the machine-learned model architecture. This difference may include a Euclidean distance between a position and/or an angular difference between orientations indicated by the ground truth trajectory and/or ground truth pose and the predicted trajectory and/or predicted pose. The loss may be used to alter one or more parameters of the architecture to reduce the loss according to a gradient descent training algorithm. In some examples, the loss may comprise multiple sub-losses that may be aggregated as a single loss (e.g., as a weighted average) or that may each be used to tune respective components of the architecture. For example, according to the later example, the loss may comprise a first loss for a difference between a ground truth target pose and the predicted target pose that may be used to alter the classification component for predicting a target pose, a lane/intersection loss for training the lane classification component, a position offset loss and/or an orientation loss for training the regression components that determine the offset(s) from the predicted target pose to determine the predicted pose.

As discussed above, the techniques discussed herein may increase the accuracy of predicting movement of an object by determining various environment-related orientations as priors to more strongly condition the model's output on normative orientations of objects in the environment, as may be indicated by lane directionality, heuristic transitions between lanes, heuristic transitions frame lane-to-lane through intersections, and/or the like. All of the techniques discussed herein may improve the safety and efficacy of autonomous vehicle operations by the increased accuracy of the predicted trajectory and/or predicted pose of an object as discussed herein. For example, this increased accuracy may allow the vehicle to determine a safer trajectory or more efficient trajectory for navigating an environment.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor), an image sensor (e.g., a visual light camera, infrared camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a prediction component 112, a planning component 114, system controller(s) 116, map data 118, and/or architecture 120. For example, the memory 108 may store processor-executable instructions that, when executed by one or more processors, execute various operations discussed herein. In some examples, the perception component 110 may include a simultaneous localization and mapping (SLAM) component.

In general, the perception component 110 may determine what is in the environment surrounding the vehicle 102 and the planning component 114 may determine how to operate the vehicle 102 according to information received from the perception component 110. For example, the planning component 114 may determine trajectory 122 for controlling the vehicle 102 based at least in part on the perception data and/or other information such as, for example, localization information (e.g., where the vehicle 102 is in the environment relative to a map and/or features detected by the perception component 110), an output determined by the architecture 120 such as a set of trajectories associated with one of the detected objects, a predicted trajectory for an object, classification of an object as being active or inactive, a lane or series of lanes associated with one of the paths of the set of trajectories, a right-of-way indication or priority level associated with an object, a control profile for predicting the object's future trajectory, and/or the like. In some examples, the perception component 110 may comprise a pipeline of hardware and/or software, which may include one or more graphics processing unit(s) (GPU(s)), tensor processing unit(s) (TPU(s)), central processing unit(s) (CPU (s)), application-specific integrated circuit(s) (ASIC(s)), field-programmable gate array(s) (FPGA(s)), ML model(s), Kalman filter(s), and/or the like.

The trajectory 122 may comprise instructions for controller(s) 116 to actuate drive components of the vehicle 102 to effectuate a steering angle, steering rate, acceleration, and/or the like, which may result in a vehicle position, vehicle velocity, and/or vehicle acceleration. For example, the trajectory 122 may comprise a target heading, target steering angle, target steering rate, target position, target velocity, and/or target acceleration for the controller(s) 116 to track. In some examples, the trajectory 122 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters).

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 110 may determine, based at least in part on sensor data, an object detection indicating an association of a portion of sensor data with an object in the environment. The object detection may indicate an object classification (e.g., semantic label, object state), sensor data segmentation (e.g., mask, instance segmentation, semantic segmentation), a region of interest (ROI) identifying a portion of sensor data associated with the object, object classification, and/or a confidence score indicating a likelihood (e.g., posterior probability) that the object classification, ROI, and/or sensor data segmentation is correct/accurate (there may be confidence score generated for each in some examples). For example, the ROI may include a portion of an image or radar data identified by an ML model or ML pipeline of the perception component 110 as being associated with the object, such as using a bounding box, mask, an instance segmentation, and/or a semantic segmentation. The object classifications determined by the perception component 110 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical and/or current object position, orientation, velocity, acceleration, classification, and/or other state of that object (e.g., door/aperture state, turning state, intent state such as activation turn signal).

To give a concrete example, the vehicle 102 may receive sensor data including image data (from one or more image sensors) and/or other sensor data associated with the environment, such as lidar data, radar data, ToF data, and/or the like. The perception component may detect and classify objects in the environment. For example, the perception component may detect dynamic objects, such as a cyclist, vehicle, pedestrian, or the like, and/or static objects, such as poles, traffic signage, general signage, a drivable surface, sidewalk, public furniture, building, etc. Referring to FIG. 1, the perception component 110 may detect vehicle 124, vehicle 126, pedestrian 128, and other objects, such as objects indicated by diagonally-hashed rectangles 134 in the top-down representation 136. In some examples, the perception component 110 may additionally or alternatively detect building 130 and building 132. In some examples, these buildings may additionally or alternatively be indicated in map data 118 stored in the memory 108. The map data 118 may indicate other stationary (static) objects and/or zones, such as crosswalks, sidewalks, signage, construction zones (e.g., which may be temporarily indicated in the map data), rules of the road (e.g., yield priority, right-of-way rules, speed limits, mandated stops) associated with regions of the environment (e.g., junctions, crosswalks, lanes), and/or the like.

In some examples, the perception component 110 may additionally or alternatively determine a likelihood that a portion of the environment is occluded to one or more sensors and/or which particular sensor types of the vehicle. For example, a region may be occluded to a camera but not to radar or, in fog, a region may be occluded to the lidar sensors but not to cameras or radar to the same extent.

The perception component 110 may additionally or alternatively determine a top-down representation 136 of the environment based at least in part on the sensor data, as discussed in U.S. Patent Application Pub. No. 2021/0181758, filed Jan. 30, 2020, and/or U.S. Pat. No. 10,649,459, filed Apr. 26, 2018, the entirety of which are incorporated by reference herein for all purposes. For example, the top-down representation may be generated based at least in part on an object detection generated by the perception component 110 and/or map data 118. FIG. 1 depicts an example top-down representation 136 that may be generated by the perception component 110 based at least in part on sensor data and/or map data 118 for the environment 138. This top-down representation 136 may include indications of detected objects as diagonally-hashed rectangles 134 and portions of the environment outside the roadway may be indicated by vertical hashes 140. In some examples, the top-down representation may include a data structure, such as an image, where each pixel is associated with one or more channels indicating different characteristics of the environment.

For example, instead of indicating color data, a pixel of the top-down representation may indicate object data and/or map data, each of which may include one or more channels of the image. In an RGB image, a first channel indicates an amount of red at a pixel, a second channel indicates an amount of blue at the pixel, and a third channel indicates an amount green at the pixel, which collectively make up a color for that pixel. However, for a top-down representation, a pixel may have channel(s) dedicated to different object data that may include a global location of the pixel (i.e., a location in the environment that the pixel is associated with), whether an object is detected as existing at the pixel location or a likelihood that an object exists at the pixel/environment location, an orientation of an object indicated as existing at the location, a velocity and/or acceleration of the object, a classification associated with an object, whether an object is static or dynamic, a track associated with the object, a signage state (e.g., red light, green light, lane unavailable, directionality of a lane), other object state (e.g., left turn signal on, vehicle left side door open), map data, environment state data (e.g., a state of a traffic light, a weather condition, or the like, although environment state data may incorporate map data and/or object data in some examples), and/or the like. To further illustrate how this may practically be carried out as an example and without limitation, an object instance channel of the pixel may indicate a binary indication, such as 1 or 0, that an object exists at the pixel/location or a likelihood that an object exists at the pixel/location that was output by the perception component 110 as a number between 0 and 1 may be converted to a value that may depend on a number of bits or dynamic range associated with the pixel.

For example, if a channel of a pixel of the top-down representation 136 has 32-bits, the likelihood may be converted to a 32-bit representation of the number between 0 and 1 a likelihood of 0.25 could be represented as the value 8 or a likelihood of 0.3 could be represented as the value 10 in the object instance channel for that pixel. Pixel channels may have more or less bits and may encode object data differently. For example, a semantic object classification may be encoded using a value where 0 represents no object being present, 1 represents a pedestrian, 2 represents a vehicle, 3 represents an oversized vehicle, 4 represents a construction zone, and/or the like. To give another candidate example, object orientation may be quantized such that orientations between 0 and 100 may be quantized as the value 0, orientations between 10° and 20° may be quantized as the value 1, and so on, depending on the number of bits available for an orientation channel associated with the pixel. In an additional or alternate example, one of the object channels may indicate whether other object channels are associated with current, previous, or predicted object data.

In some examples, multiple versions of the top-down representation environment may be determined in association with different times. For example, a first top-down representation may be associated with a current environment state (e.g., current object detections, map data, and/or general environment state data), one or more second top-down representations may be associated with previous environment state(s), and/or one or more third top-down representations may be associated with predicted environment state(s). In some examples, these different top-down representations may be used to generate a track associated with an object that identifies that object data detected in association with an object at two different times, as indicated in two different top-down representations, is associated with the same object. In other words, the track identifies that two object detections generated at two different times are associated with a same object and therefore maintains an association of current and/or historical attributes detected in association with the object, such as the object's classification (e.g., pedestrian, cyclist, vehicle, construction zone, construction vehicle, signage), state (e.g., signage state, loading/unloading, parking, yielding, turning, aperture/door open/closed), pose (e.g., position and/or orientation), velocity (e.g., latitudinal, longitudinal, angular such as a yaw rate), acceleration (e.g., latitudinal, longitudinal, angular such as a yaw acceleration), and/or the like.

The top-down representation 136 may additionally or alternatively include channel(s) indicating map data, such as the existence of a roadway, a type of roadway junction (e.g., four-way controlled intersection, T-junction uncontrolled, six-way light-controlled intersection), signage existence and/or type (e.g., yield sign, traffic control light), sidewalk existence, region of interest (e.g., construction zone, crosswalk, parking location, passenger pickup/drop-off location), and/or the like. The channel(s) of the top-down representation 136 may additionally or alternatively indicate that a location associated with a pixel is outside a roadway and/or a sidewalk to facilitate exclusion of some areas of the top-down representation from processing by the architecture 120 discussed herein to reduce latency and computational processing.

In some examples, the map data 118 may be separate from the top-down representation 136 but a portion of the top-down representation 136 may be associated with a corresponding portion of the map data. In some examples, the map data 118 may indicate roadway shape(s)/extents, lane location(s), lane directionality, intersection types, heuristic lane change shapes, heuristic intersection crossing shapes, and/or target poses. In some examples, the target poses may indicate discrete poses within lanes and/or intersections and may be pre-generated by a component that processes the map data to generate the target poses. A target pose may indicate a position within a lane or intersection and an orientation associated with the lane or intersection (i.e., a "lane orientation"). The target pose may indicate the position in global or local coordinates and may indicate the orientation in degrees, radians, or the like. For example, the target pose may indicate an orientation associated with maintaining a position within a lane (e.g., going straight), transitioning between lanes, and/or transitioning through an intersection to a legally corresponding or illegal lane (e.g., to allow the architecture discussed herein to predict illegal maneuvers as well, like turning into one lane further from the lane an object should have turned into legally).

The data produced by the perception component 110 may be collectively referred to as perception data, which may include the top-down representation 136, object detection data, and/or a track associated with an object. Once the perception component 110 has generated perception data, the perception component 110 may provide the perception data to prediction component 112 and/or the planning component 114. The perception data may additionally or alternatively be stored in association with the sensor data as log data. This log data may be transmitted to a remote computing device (unillustrated in FIG. 1 for clarity) for use as at least part of training data for architecture 120.

In some examples, the prediction component 112 may receive sensor data and/or perception data and may determine a predicted state of dynamic objects in the environment. In some examples, dynamic objects may include objects that move or change states in some way, like traffic lights, moving bridges, train gates, and the like. The prediction component 112 may use such data to a predict a future state, such as an object position, orientation, velocity, acceleration, other object state, and/or the like, and/or how such data changes over time (i.e., a predicted trajectory) which collectively may be described as prediction data. For example, the architecture 120 discussed herein may determine a predicted pose for a detected object, such as vehicle 126, and may determine a predicted trajectory for the detected object, at least partly by using the predicted pose. The predicted trajectories 142 depicted in FIG. 1 include a predicted trajectory that does not use the techniques discussed herein illustrated in a dashed line. Note that this predicted trajectory drifts left, potentially due to sensor noise or underfitting of the model, which may be unrealistic, as a vehicle may be more likely to stay closer to a center of the lane. The predicted trajectories 142 include a predicted trajectory indicated by a solid line that may be generated using the architecture 120 discussed herein. Note that the architecture 120 and its operations combat the drift introduced by underfit parameters or various noise in the system, resulting in a predicted trajectory that stays closer to the lane center. Further note that because the architecture 120 uses a track associated with the object and a top-down representation of the environment, in some cases the architecture 120 may rightly generate a predicted trajectory that drifts towards a lane edge, potentially due to another object's movement(s) indicated in the top-down representation (e.g., the drift could be the vehicle 126's predicted response to the other object entering the vehicle's lane or moving toward entering the vehicle's lane) and/or the object's track for which the predicted trajectory was generated (e.g., the vehicle 126's track may indicate that the object is moving in a manner the parameters of the architecture 120 predicts as being indicative of a lane change).

In some examples, a predicted trajectory may include a set of predicted positions and/or orientations of the object, depicted as a line (e.g., a line may be regressed or otherwise fit to set of positions and/or orientations), although the trajectory may comprise a discrete set. Moreover, a trajectory may be continuous, identifying continuous positions and/or orientations, or it may be discrete, identifying discrete positions and/or orientations along the predicted trajectory. In some examples, the trajectory may indicate a set or continuous indication of position and/or orientation as a function of time or, in other examples, the trajectory may instead be a path that indicates the set or continuous indication of position and/or orientation without regard to time.

The planning component 114 may use the perception data received from perception component 110 and/or prediction data received from the prediction component 112 and/or architecture 120, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 114 may determine a route for the vehicle 102 from a first location to a second location; generate, substantially simultaneously and based at least in part on the perception data and/or simulated perception data (which may further include predictions regarding detected objects in such data), a plurality of candidate trajectories for controlling motion of the vehicle 102 in accordance with a receding horizon technique (e.g., 1 micro-second, half a second) to control the vehicle to traverse the route (e.g., in order to avoid any of the detected objects); and select one of the candidate trajectories as a trajectory 122 of the vehicle 102 that may be used to generate a drive control signal that may be transmitted to drive components of the vehicle 102. In some examples, the trajectory 122 may be part of a series of trajectories determined by a tree search conducted by the planning component 114 based at least in part on the sensor data, perception data, prediction data, map data 118, and/or top-down representation 136, as discussed in more detail in U.S. Patent Application Pub. No. 2023/0041975, filed Aug. 4, 2021, the entirety of which is incorporated by reference herein for all purposes. FIG. 1 depicts an example of such a trajectory 122, represented as an arrow indicating a heading, velocity, and/or acceleration, although the trajectory itself may comprise instructions for controller(s) 116, which may, in turn, actuate a drive system of the vehicle 102.

In some examples, the planning component 114 may determine the trajectory 122 based at least in part on determining a predicted trajectory (that may be time-variant) for an object that may be determined based at least in part on one or up to all of the set of trajectories determined by the architecture 120, a right-of-way determination for the object, lane(s) determined to be associated with the object based at least in part on the predicted trajectory, or the like, as discussed in more detail in U.S. patent application Ser. No. 18/516,618, filed Nov. 21, 2023, the entirety of which is incorporated by reference herein for all purposes.

In some examples, the controller(s) 116 may comprise software and/or hardware for actuating drive components of the vehicle 102 sufficient to track the trajectory 122. For example, the controller(s) 116 may comprise one or more proportional-integral-derivative (PID) controllers to control vehicle 102 to track trajectory 122.

Example System

Figure 2:
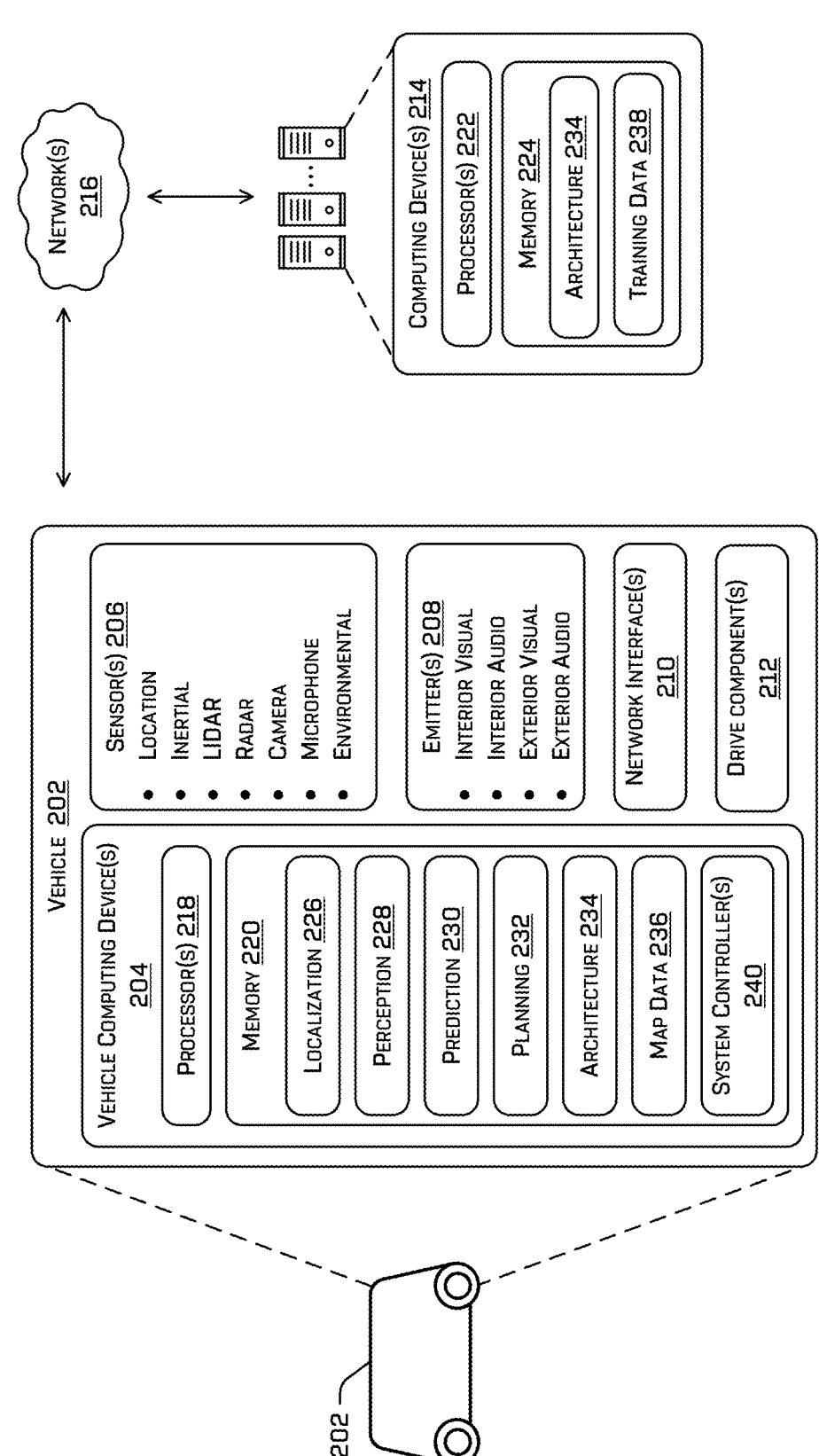
FIG. 2 illustrates a block diagram of an example system integrating and/or training the machine-learned model architecture discussed herein to improve the safety and efficacy of a vehicle.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 3G, 4G, 4G LTE, 5G, etc.), or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, architecture 234, map data 236, training data 238, and/or system controller(s) 240 zero or more portions of any of which may be hardware, such as GPU(s), CPU(s), and/or other processing units. Perception component 228 may represent perception component 110, prediction component 230 may represent prediction component 112, planning component 232 may represent planning component 114, architecture 234 may represent architecture 120, map data 236 may represent map data 118, and/or system controller(s) 240 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment, such as map data 236, and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component 226 may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 202, and/or the like In some instances, the localization component 226 may provide data to various components of the vehicle 202 to determine an initial position of an autonomous vehicle for generating a trajectory and/or for generating map data. In some examples, localization component 226 may provide, to the perception component 228, prediction component 230, and/or architecture 234 a location and/or orientation of the vehicle 202 relative to the environment and/or sensor data associated therewith.

In some instances, perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, acceleration, and/or other state associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the classification(s), position(s), orientation(s), velocity(ies), acceleration(s), and/or other states of the objects, map data, and/or general environment state data for the environment. For example, the top-down representation may be an image with additional data embedded therein, such as where various pixel channel values encode the perception data and/or map data discussed herein. Data determined by the perception component 228 is referred to as perception data.

The prediction component 230 may predict a future state of an object in the environment surrounding the vehicle 202. In some examples, the prediction component 230 may include the architecture 234, although in additional or alternate examples the architecture 234 may be a separate component. The future (predicted) state may include a predicted position and/or orientation of an object and/or a predicted trajectory of the object, which may indicate a predicted series of or continuous indication of position and/or orientation of the object. In some examples, the predicted position and/or orientation and/or predicted trajectory may be time-invariant (without regard to time), although in another example, the predicted position and/or orientation and/or predicted trajectory may be time-variant. In the latter example, a pose of the trajectory and/or the predicted pose may be associated with a future time. Accordingly, the predicted trajectory may inherently encode vehicle velocity based on the distance covered by the predicted poses in time. Data determined by the prediction component 230 is referred to as prediction data. In some examples, the prediction component 230 may determine a top-down representation of a predicted future state of the environment. For example, the top-down representation may be an image with additional data embedded therein, such as where various channel pixel values encode the prediction data discussed herein.

The planning component 232 may receive a location and/or orientation of the vehicle 202 from the localization component 226, perception data from the perception component 228, and/or prediction data determined by the prediction component 230 and/or architecture 234 and may determine instructions for controlling operation of the vehicle 202 based at least in part on any of this data. In some examples, the memory 220 may further store map data 236 and this map data may be retrieved by the planning component 232 as part of generating the top-down representation of the environment discussed herein. In some examples, determining the instructions may be based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

In some examples, the planning component 232 may provide a candidate action to the architecture 234 as part of a tree search for the architecture 234 to determine a predicted pose and/or predicted trajectory of an object based on the candidate action. The resultant predicted pose and/or predicted trajectory determined by the architecture 234 may then be used as part of determining a cost associated with the candidate action and a determination of whether to use the candidate action as part of a trajectory for controlling the vehicle or to discard the candidate action in preference of another candidate action for inclusion in the trajectory.

In some examples, the map data 236 may comprise a two-dimensional or three-dimensional representation of the environment, characteristic(s) associated therewith, and/or embedding(s). A two-dimensional representation may include, for example, a top-down representation of the environment and a three-dimensional representation may comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); a rule of the road associated with a portion of the map data; conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 202; and/or the like. The occlusion data may further indicate occlusions to different classes of sensors, such as portion(s) of the environment occluded to visible light cameras but not to radar or lidar, for example. The two-dimensional representation and/or three-dimensional representation may have embeddings associated therewith that encode this data via the learned process discussed herein. For example, for a three-dimensional representation of the environment comprising a mesh, an embedding may be associated with a vertex of the mesh that encodes data associated with a face that may be generated based on one or more vertices associated with the face. For a two-dimensional representation of the environment an edge or other portion of the top-down representation may be associated with an embedding.

The memory 220 and/or 224 may additionally or alternatively store a mapping system (which could be part of a SLAM component of localization component 226), a planning system, a ride management system, simulation/prediction component, etc.

As described herein, the localization component 226, the perception component 228, the prediction component 230, the planning component 232, architecture 234, and/or other components of the system 200 may comprise one or more ML models. For example, localization component 226, the perception component 228, the prediction component 230, the planning component 232, and/or the architecture 234 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Figure 3A:
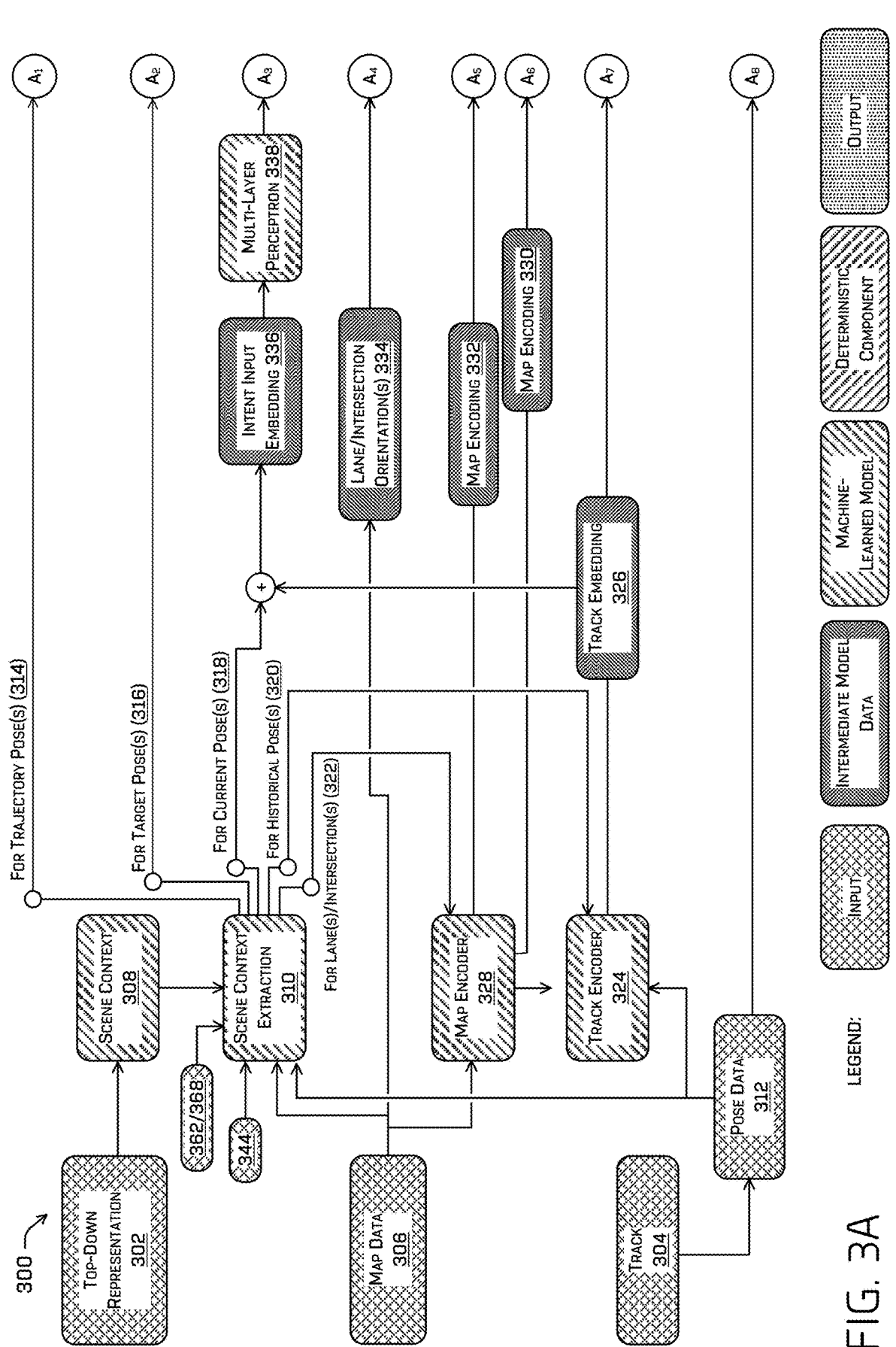
FIGS. 3A-3C illustrate a block diagram of an example architecture for predicting a future state of an object and using that future state to determine a predicted trajectory for the object.
Figure 3B:
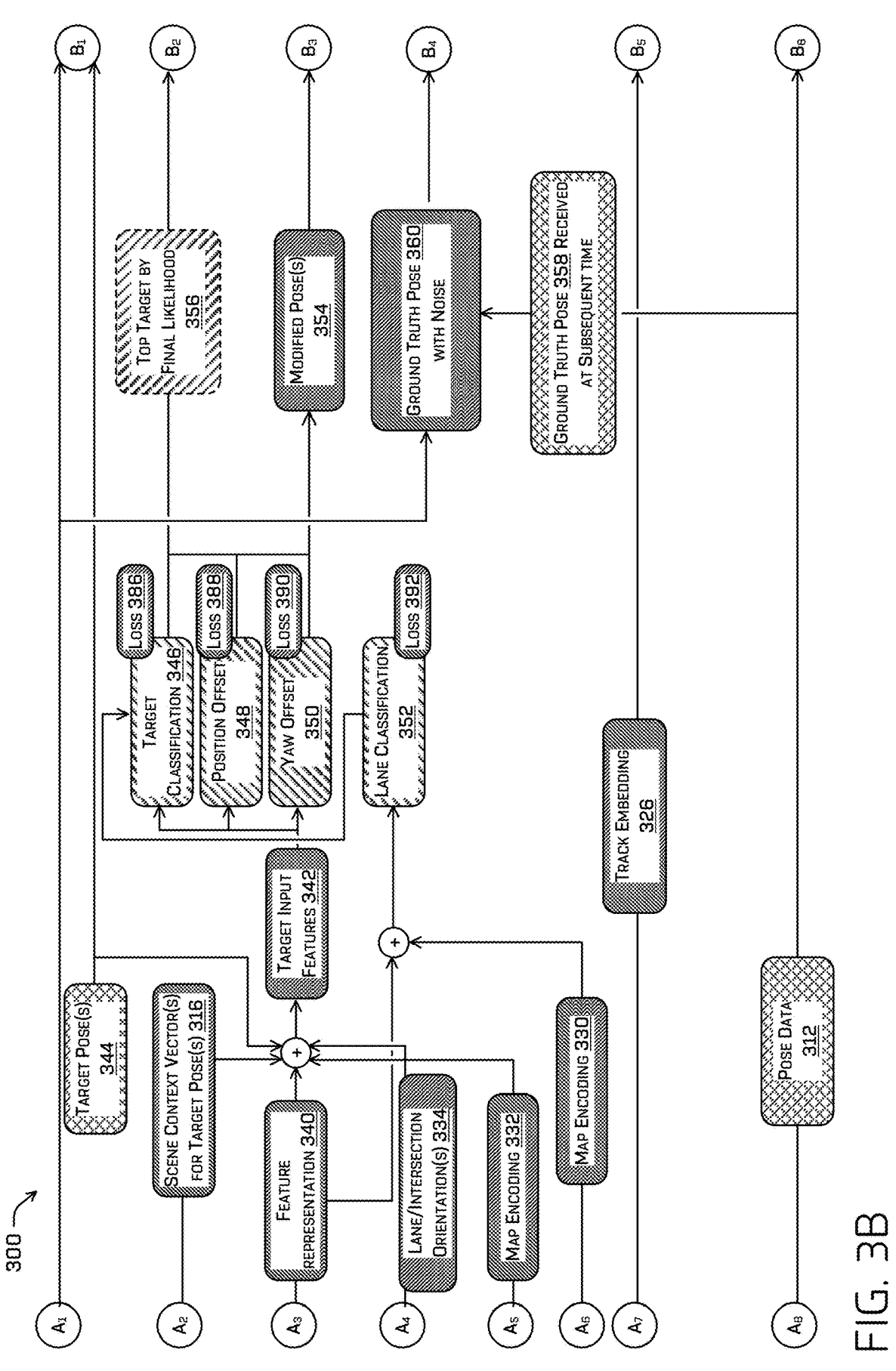
Figure 3C:
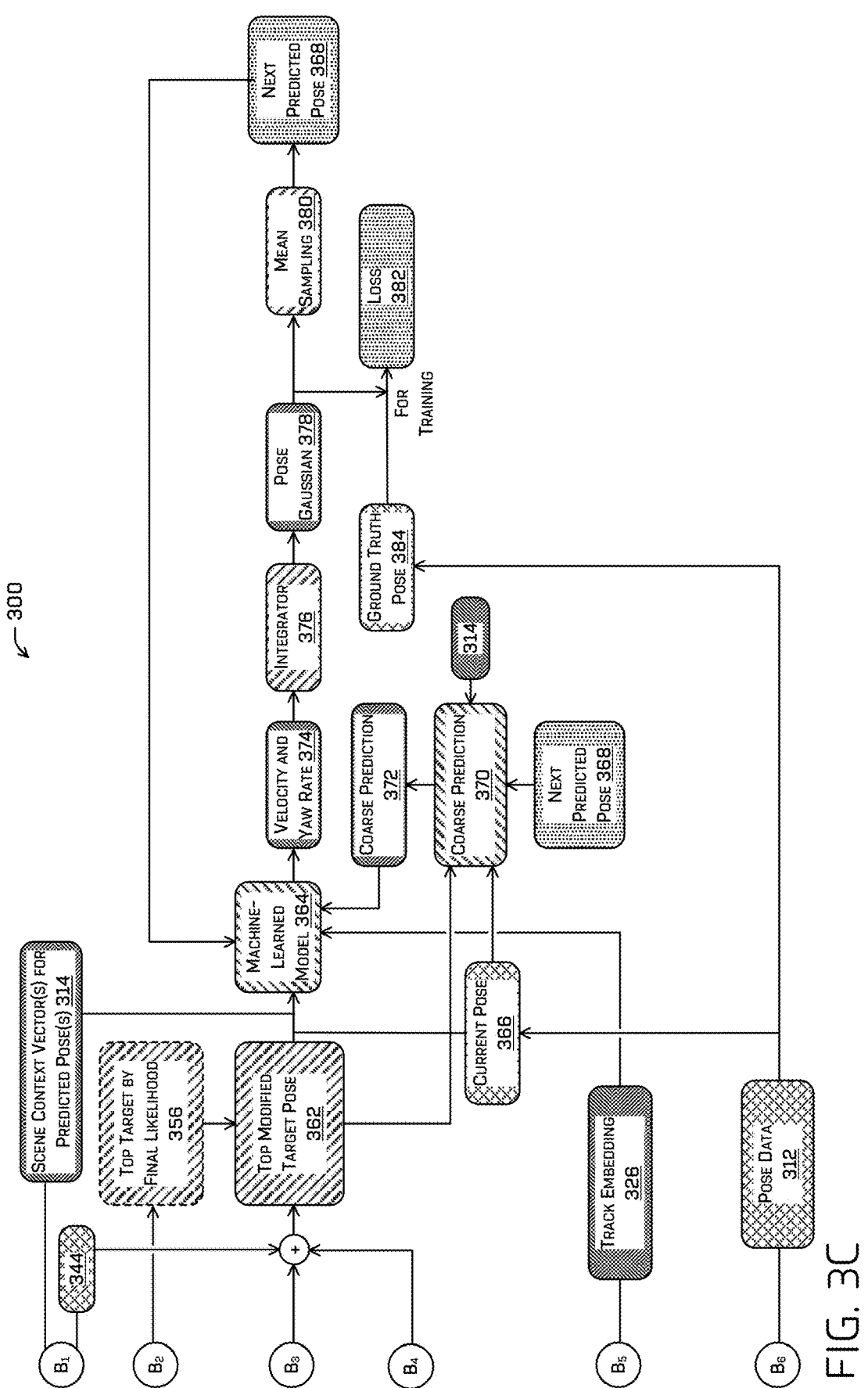

In some examples, the architecture 234 may comprise machine-learned model components, such as those discussed in FIGS. 3A-3C, for determining a predicted pose and/or a predicted trajectory of an object. The architecture 234 may comprise one or more different types of machine-learned model components are part of the architecture 234, as discussed further herein.

In some examples, the architecture 234 may be trained at computing device(s) 214 based at least in part on training data 238. FIGS. 6 and 7 illustrate examples of such training data. The training data 238 may comprise sensor data and/or perception data that composes a ground truth object track indicating a position and/or orientation of an object over time and may comprise hundreds or thousands of object tracks that may be used for training the architecture 234. For example, the training data 238 may be amalgamated from sensor data collected by and/or perception data generated by the vehicle 202 and/or one or more other vehicles for objects encounter by those vehicle(s). During training, the original sensor data may be provided as input to the architecture 234 discussed herein and the architecture 234 may be trained based at least in part on a loss based on a difference between the ground truth object track associated with the object and a predicted trajectory generated by the architecture 234 and/or a difference between a portion of the ground truth object track associated with a same time as a predicted pose. Determining this difference may comprise determining a lateral, longitudinal, and/or angular difference between poses identified by the pose/trajectory associated with a same time (i.e., a predicted pose associated with a future time that corresponds to perception data generated using sensor data recorded at that future time when it comes to pass). Note that the ground truth object track wouldn't be available to the vehicle 202 during inference and would just be part of training. The ground truth object track would have been generated by a vehicle at a time later than the time at which the sensor data was collected.

In some examples, the loss may include an L1 loss, L2 loss, Huber loss, square root of the mean squared error, Cauchy loss, or another loss function and may be determined based on a difference between the predicted trajectory to the ground truth object track or predicted pose to a portion of the ground truth object track and that loss may be backpropagated through the component(s) of the architecture 234 discussed herein. This means that parameter(s) of any of the components of the architecture 234 may be altered (using gradient descent) to reduce this loss such that, if the architecture 234 repeated the process on the same input data, the resultant loss would be less than it was on the last run. This process may be repeated for multiple iterations of data, known as a training dataset. For example, the training may comprise altering one or more weights and/or biases and/or other parameter(s) of the component(s) of the architecture 234. In some examples, some component(s) of the architecture 234 may be trained separately, such as the portion of the architecture 234 that generates the prediction pose and the portion of the architecture 234 that generates the predicted trajectory, although in other examples, these component(s) may be trained together.

In some examples, the loss may comprise multiple sub-losses that may be aggregated as a single loss (e.g., as a weighted average) or that may each be used to tune respective components of the architecture. For example, according to the later example, the loss may comprise a first loss for a difference between a ground truth target pose and the predicted target pose that may be used to alter the classification component for predicting a target pose, a lane/intersection loss for training the lane classification component, a position offset loss and/or an orientation loss for training the regression components that determine the offset(s) from the predicted target pose to determine the predicted pose, an average position loss and/or orientation loss for training the predicted trajectory component, etc.

Any type of machine-learning can be used consistent with this disclosure. For example, machine-learning models can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, U-Net, EfficientDet, and the like; visual transformer(s) (ViT(s)), such as a bidirectional encoder from image transformers (BEiT), visual bidirectional encoder from transformers (Visual-BERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 240 (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 232 may generate instructions based at least in part on perception data generated by the perception component 228, prediction component 230 and/or architecture 234 and transmit the instructions to the system controller(s) 240, which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Machine-Learned Architecture for Generating Diverse Time-Invariant Object Trajectory Predictions FIGS. 3A-3C illustrates a block diagram of an example architecture 300 for determining a predicted pose and/or predicted trajectory of an object. The object may have been detected by a perception component of a vehicle and attendant data related thereto may have been generated by the perception component, such as a top-down representation 302 of the environment and/or a track 304 associated with the object. The example architecture may represent architecture 234 and may comprise a pipeline of various machine-learned model(s) and deterministic component(s), as discussed further herein.

Turning to FIG. 3A, in some examples, the top-down representation 302 may include a data structure, such as an image, where each pixel is associated with one or more channels indicating different characteristics of the environment, such as object detection data, map data 306, general environment data, and/or the like. In an additional or alternate example, the map data 306 may be a separate data structure from the top-down representation 302 or may be extracted from the top-down representation 302 for separate processing by the component(s) discussed herein. In an example where the data structure includes an image, instead of indicating color data, a pixel of the top-down representation may indicate object data, map data, and/or general environment data, each of which may be associated with one or more channels of the image. Additionally or alternatively, the top-down representation 302 may indicate such data as a vector, tensor, or matrix (e.g., where a first portion of the vector indicates a location in the environment and a second portion associated with the first portion indicates any object data, map data, and/or general environment data associated with that location). The object data indicated in the top-down representation 302 may comprise object detection data associated with the object for which the prediction(s) are to be generated and/or any other objects that have been detected by the perception component, along with their attendant data, such as confidence score(s) (e.g., posterior probability(ies) indicating an estimate of the accuracy of the data with which a posterior probability is associated), object classification (e.g., pedestrian, cyclist, vehicle, construction zone, static (immovable)/dynamic (movable) object), velocity, acceleration, orientation, and/or the like. Additionally or alternatively, the architecture 300 may be used to determine a predicted pose and/or predicted trajectory for each object detection indicated in the top-down representation 302. In such an example, the object detections for which the architecture 300 generates predictions may be filtered to exclude an object detection associated with an object that is within a threshold distance of a maximum distance from the vehicle 202 and that has a track indicating that the object is moving away from the vehicle/towards a circumference indicated by the maximum distance. In other words, objects that are about to pass out of a region associated with the vehicle may be excluded from the prediction.

In some examples, general environment data indicated in the top-down representation 302 may comprise dynamic map data (e.g., a traffic light state, a stop/go state at a construction site, the existence of a construction region), weather conditions, and/or the like. Using the top-down representation 302 as part of the input to the trajectory prediction architecture 300 allows the modified target poses determined by the machine-learned models discussed herein to be conditioned on the various data indicated in the top-down representation 302, which could include things like the existence of other objects, lane locations, lane directionality, and/or the like. In some examples, the top-down representation 302 may comprise multiple top-down representations associated with multiple times, such as a current time and up to p time steps into the past, where p is a positive integer.

In some examples, a scene context component 308 may determine a scene context feature map using the top-down representation 302. For example, the scene context component 308 may comprise a machine-learned model, such as a convolutional neural network (CNN) (e.g., U-Net, a fully-convolutional network), that determines the scene context feature map. The feature map may preserve the spatial information of the top-down representation, such that a portion of the feature map and a portion of the top-down representation may correspond with a same location in the environment. However, the feature map may additionally indicate a number of features less than, equal to, or greater than the features identified in the top-down representation as a machine-learned representation of those features.

This scene context feature map may then be provided to a scene context extraction component 310 that may determine a feature vector or other portion of the scene context feature map that is associated with various pose data discussed herein. For example, the scene context extraction component may use a pose that is part of a predicted trajectory (e.g., indicated by the current pose 366 and/or other pose data 312, the top modified target pose 362, and/or one of more of the next predicted pose(s) 368) to determine a predicted trajectory pose scene context vector 314, a target pose (e.g., indicated by one of the target pose(s) 344) to determine a target pose scene context vector 316, a current pose (indicated by pose data 312) of the object for which a prediction is being generated to determine a current pose scene context vector 318, a historical pose (indicated by pose data 312) to determine a historical pose scene context vector 320, and a lane or intersection (indicated by the map data 306) to determine a lane or intersection scene context vector 322. In some examples, the scene context extraction component 310 may comprise a region of interest (ROI) pooling machine-learned model (e.g., the ROI pooling machine-learned model may comprise an ROI pooling layer, one or more fully connected layer(s) following the ROI pooling layer, a softmax, and/or confidence score regression layer).

In some examples, the track 304 may indicate historical and/or current object data associated with the object for which the predicted pose and/or predicted trajectory is being determined by the architecture 300. For example, the track 304 may indicate historical and/or current object position, orientation, velocity, acceleration, classification, and/or other state of that object (e.g., door/aperture state, turning state, intent state such as activation turn signal). In an additional or alternate example, the pose data 312 may indicate historical pose data and the current pose of the object may be processed separately, as depicted. In examples where the architecture 300 determines a predicted pose and/or predicted trajectory for multiple objects, each of those object's tracks may be provided as input as a track 304.

In some examples, pose data 312 may be extracted from the track 304. For example, the track may indicate more than just pose data detected for an object, as discussed above. Accordingly, the pose data 312 may be extracted for use in determining scene context for pose(s) indicated in the pose data 312 for an object. Where the track indicates a current and historical pose data, the scene context extraction component 310 may determine a scene context vector for up to all of the current and historical poses indicated in the pose data 312.

Additionally or alternatively, the pose data 312 may be encoded by a track encoder 324 as a track embedding 326, which may comprise a graph where nodes thereof indicate an embedding characterizing movement and/or pose(s) indicated in the pose data 312 and edges therebetween indicate a relation of the pose(s) to each other, such as a sequence of time or the like. Additionally or alternatively, the track encoder 324 may determine the track embedding 326 using late fusion features associated with the entity indicated by the track 304, such as current object detection data and/or data including the pose data and including addition features, such as object classification, object state, velocity, acceleration, signage state relevant to the object (e.g., a traffic light state that is relevant to the object, a stop sign that is relevant to the object), and/or the like. Additionally or alternatively the track embedding 326 may, by virtue of the location in the embedding space at which an embedding is located, characterize an interaction or relative pose/movement compared to other object(s) in the environment and/or the vehicle 202. An embedding may be a high-dimensional vector or tensor that represents the input data in an embedding space where distance in the embedding space represents similarity between input data the more distant two embeddings are in the embedding space, the less similar the corresponding input data. Additionally or alternatively, the track embedding 326 may be an embedding or set of embeddings without a graph structure. An embedding may be a vector or tensor indicating a location in an embedding space, which may be a multi-dimensional space, the dimensions of which are defined as a hyperparameter of a respective model that outputs the embedding (e.g., the dimensions may be 3, 10, in the hundreds, or any other number). A location in an embedding space may characterize, by distance from other embeddings in the embedding space, the object's movement and/or pose over time. In other words distance in the embedding space indicates a difference in the characteristics and the In some examples, the track encoder 324 may comprise a graph neural network (GNN), a GNN with gated recurrent unit(s) (GRU(s)) (e.g., a gated GNN, GGNN), an embedding model (e.g., Ada2, singular value decomposition (SVD), a VGG network, global vectors for word representation (GloVe), Word2Vec, bidirectional encoder representations of transformers (BERT), t-distributed stochastic neighbor embedding (t-SNE), a generative pre-trained transformer (GPT) embedding model, the encoding portion of a transformer-based machine-learned model), and/or the like.

In some examples, the track encoder 324 may additionally or alternatively use a map graph embedding and/or scene context vector(s) (320) associated with historical pose(s) as input to generate the track embedding 326 (e.g., by projecting the map graph embedding and scene context vector(s) into an embedding space). In some examples, the map graph embedding and the scene context vector(s) associated with the historical pose(s) may be concatenated together for processing by the track encoder 324. For example, the track encoder 324 may be trained to project this concatenated data into an embedding space as an embedding or set of embeddings (e.g., where the different embeddings in the set are associated with different historical time steps).

In some examples, the map graph embedding may comprise a graph augmented with a feature representation such as an embedding generated by a map encoder 328. In some examples, the map data 306 may be represented as a graph where the different nodes may indicate different lanes and/or intersections and the edges therebetween may indicate a relation of those lanes to each other. For example, the map data may indicate a lane as a polyline, although any other representation of lane shapes, extents, and/or relations may be used, such as a Bezier curve, piecewise linear curve, piecewise polynomial curve, a spline, and/or the like. In some examples, the graph may additionally or alternatively include weights that indicate a likelihood of an object transitioning to another lane or intersection from a current lane or intersection that may be determined based at least in part on log data received from one or more vehicles. In some examples, the map encoder 328 may comprise a transformer encoder/embedding model (e.g., Ada2, SVD, a VGG network, GloVe, Word2Vec, BERT, t-SNE, a GPT embedding model, the encoding portion of a transformer-based machine-learned model). The map encoder 328 may encode the map data 306 indicated as a graph with embedding(s) associated with the node(s) and/or edge(s) instead of the original feature data indicated by the map data 306. The map graph embedding may comprise one or more embeddings associated with different node(s) and/or edge(s) of the graph output by the map encoder 328. In other words, the map encoder 328 may determine an embedding for up to each lane and/or intersection within a threshold distance of the object and/or the vehicle 202.

Additionally or alternatively to using the map graph embedding (and the graph associated there with) to generate the track embedding 326, the map graph embedding (and graph) may be used to determine a map encoding 332 and/or map encoding 330. The map encoding 330 and the map encoding 332 may be identical and may each comprise the map graph embedding or, in another example, the map encoding 330 and the map encoding 332 may be generated from the map graph embedding with different dimensions, according to the input dimensions of the lane classification component 352 versus input dimensions of the target classification component 346, the position offset component 348, and/or the yaw offset component.

In some examples, lane and/or intersection orientation(s) 334 indicated by the map data 306 may also be extracted from the map data 306 for subsequent use in the architecture 300. The orientation(s) 334 may be extracted based on the location of the target pose(s) discussed subsequently. In other words, for a particular target pose, the architecture 300 may extract an orientation from the map data 306 at the position indicated by that particular target pose. Additionally or alternatively, a target pose may natively indicate a tangent of the lane. Regardless of the method, however, a target pose will end up indicating a position within a lane/intersection, and an orientation (e.g., a tangent) of the lane/intersection at that position.

In some examples, the track embedding 326 and the scene context vector associated with a current position of the object may be aggregated (e.g., concatenated) to generate an intent input embedding 336. Note that scene context vector(s) for the historical poses of the object may already be indicated as part of the track embedding 326. In an example where this isn't the case, the scene context vector associated with a current pose and/or historical poses of the object may be aggregated (e.g., concatenated) with the track embedding 326 as the intent input embedding 336.

In an example where the track embedding 326 is used to generate the intent input embedding 336, the scene context vector associated with a current pose of the object may be aggregated with the track embedding 326 as the intent input embedding 336. Note that the track embedding 326 may already comprise an encoding of the historical pose(s) associated with the object determined by the track encoder 324.

In some examples, the intent input embedding 336 may be provided as input to a multi-layer perceptron 338 (MLP) or any other suitable machine-learned model, such as a CNN, GNN, or the like. The multi-layer perceptron 338 may determine a feature representation 340, depicted in FIG. 3B. At a high-level, to give a high level summary of the data used by the multi-layer perceptron 338 to determine this feature representation 340, the multi-layer perceptron 338 may use encoding(s)/embedding(s) of portion(s) of the top-down representation (e.g., related to a current and/or historical pose of the object), and current and/or historical track data associated with the object, including at least encoded pose data associated with the object but potentially also including additional (late fusion) track data associated with the object.

Turning to FIG. 3B, the feature representation 340 generated by the multi-layer perceptron 338 may comprise a feature map or feature vector generated according to the hyperparameters of the multi-layer perceptron 338. For example, whether the feature representation 340 may depend on a configuration and number of output heads of the multi-layer perceptron 338 and the values populating the feature representation 340 may be determined by processing the input data to the multi-layer perceptron 338 using the trained weights and/or biases of the nodes of the multi-layer perceptron 338 and as a function of the connections, number of layers, etc. of the multi-layer perceptron 338.

The architecture 300 may use some of the data discussed so far to determine a set of target input features 342 for a target pose of the target pose(s) 344. The architecture 300 may determine a set of target input features 342 for each target pose of the target pose(s) 344 within a threshold distance of the object or the vehicle 202. In some examples, the target pose(s) 344 may be pre-generated locations within the lane(s) and/or intersection(s) identified by the map data. For example, a separate component may create target poses at distance intervals (e.g., every 0.1 meters, 0.5 meters, 1 meter, 2 meters, any other distance) along a center or median of a lane (or polyline, curve, or other representation of the lane center/median) that indicates a position along the center or median of the lane and an orientation of the lane at that position. For example, the orientation of the lane at that position may be a tangent of the polyline or curve representing the center or median of the lane. Note that the map data may indicate a directionality that may be used to determine the sign or directionality of the orientation. For an intersection, target poses may be generated at points along a polyline, curve, or the like connecting legal paths between lanes entering and exiting the intersection. Additionally or alternatively, the lane centers and/or paths through intersections may be defined based at least in part on log data received from one or more vehicles or sensor(s) in the environment, allowing a greater degree of accuracy of the target pose(s) to correspond with average or median driving habits of objects that occupy the lane(s) and/or intersections. Accordingly, the target pose(s) 344 may indicate an x-position, y-position, and an angle, such as a yaw, associated with a lane or intersection reference such as the line(s) and/or curve(s) discussed herein.

The architecture 300 may determine a set of target input features 342 for a target pose of the target pose(s) 344 based at least in part on a scene context vector determined by the scene context extraction component 310 for the target pose (316), the feature representation 340, a lane or intersection orientation 334 (depending on whether the target pose is located with a lane or intersection), a portion of the map encoding 332 associated with the position indicated by the target pose (e.g., a portion, such as a vector, region, portion of the graph, of the map encoding augmented with the lane/intersection scene context vector for the target pose's position in the environment), and/or a portion of the map encoding 330 associated with the position indicated by the target pose.

This set of target input feature 342 may be used by a target classification component 346, a position offset component 348, and a yaw offset component 350 to determine their respective outputs.

The target classification component 346 may use the set of target input features 342 and lane and/or intersection score (e.g., a likelihood, posterior probability) output by the lane classification component 352 for the lane in which the target pose exists to determine a score (e.g., a likelihood, posterior probability) associated with the target pose for which the set of target input features 342 were determined. For example, the target classification component 346 may determine a first likelihood that the object will occupy the target pose, which may be multiplied by a second likelihood that the object will occupy the lane or intersection in which the target pose exists to determine a final likelihood that the object will occupy the target pose and its lane/intersection at the future time. The target classification component may determine such a score for up to all of the target pose(s) 344 for which target input features 342 were generated.

In some examples, the likelihood determined for the target pose may be based at least in part on a lane or intersection score determined by the lane classification component 352 for the lane or intersection that the target pose occupies. For example, a likelihood output by the target classification component 346 may be multiplied by a likelihood output by the lane classification for the lane or intersection in which the target pose exists. The lane classification component 352 may determine a score (e.g., a likelihood, posterior probability) for each lane and/or intersection within a threshold distance of the object and/or the vehicle 202. Accordingly, using such a score to determine a likelihood for a particular target pose may comprise sampling the likelihood output by the lane classification component 352 corresponding with a lane or intersection in which the target pose exists and multiplying the likelihood output by the lane classification component 352 by the likelihood output by the target classification component 346 for the target pose.

In some examples, and as depicted in FIGS. 3B and 3C, the target pose with the highest final likelihood (lane/intersection likelihood multiplied by the target pose likelihood) may be selected as the predicted target pose from which the predicted pose of the object may be determined.

In some examples, the position offset component 348 may comprise two output heads that each output one value or an output head that outputs two values. Regardless, the two outputs may comprise a lateral offset and a longitudinal offset. The lateral and longitudinal offset may distances used to modify a target pose. In some examples, the position offset component 348 may determine a lateral and/or longitudinal offset (i.e., a position offset) for each target pose for which a set of target input features 342 was created. In an additional or alternate example, the position offset component 348 may determine a position offset for only the target pose with the greatest final likelihood, in which case the target pose with the greatest likelihood may be computed first. In some examples, the position offset component 348 may determine the position offset for a target pose using the set of target input features 342 generated for that target pose according to the discussion herein. The position offset values may be added to the position indicated by the target pose. Since the sign of the position offset values may be positive or negative, adding a negative position offset may result in subtracting the position offset from the position. Functionally, the position offset 348 modifies the x- and y-values of the target pose's position In some examples, the yaw offset component 350 may determine a yaw offset based at least in part on the set of target input features 342 generated for a particular target pose. This yaw offset may be an angle that may be used to modify the orientation indicated by the target pose for which the yaw offset was determined. In some examples, the yaw offset component 350 may determine a yaw offset for each target pose for which a set of target input features 342 was created. In an additional or alternate example, the position offset component 348 may determine a position offset for only the target pose with the greatest final likelihood. The yaw offset may be added to the orientation indicated by the target pose, which may functionally add or subtract from the orientation indicated by the target pose since the sign of the yaw offset may be positive or negative.

In some examples, the target classification component 346, the position offset component 348, the yaw offset component 350, and the lane classification component 352 may each comprise a same or different type of machine-learned model. For example, these components may include different multi-layer perceptrons, CNNs, GNNs, transformer-based machine-learned models, and/or the like. However, the target classification component 346 and the lane classification component 352 may be considered classification machine-learned models, since they determine likelihoods for a discrete set of possible outputs, whereas the position offset component 348 and the yaw offset component 350 may be considered regression components, as their outputs are the final output themselves, indicating distances and an angle, respectively.

Note that, during training of the architecture 300 discussed herein, a ground truth pose 358 received at a subsequent time may be received from a perception component of the vehicle once sufficient time has passed such that a time associated with the ground truth pose 358 is a same time as the future (then present) time for which the modified pose(s) 354 were generated as a prediction. In some examples, noise may be added to this ground truth pose as ground truth pose with noise 360 and this noisy ground truth pose may be provided as input to the subsequent portion of the architecture 300 instead of the top modified pose or top n modified poses. This may be helpful, particularly for the early stages of training the model, where the modified pose(s) may as-of-yet be rather inaccurate and training the machine-learned model 364 may accordingly be highly inefficient due to the errors attributable by the as-of-yet undertrained components earlier in the architecture 300. Additionally or alternatively, during training, instead of adding noise to the ground truth pose to create the ground truth pose with noise 360, the offsets determined by position offset component 348 and yaw offset component 350 for a target pose nearest the ground truth pose may be added to the ground truth pose as a ground truth pose with offsets. This ground truth pose with offsets may be used by the subsequent components of the architecture 300 discussed herein during training. Additionally or alternatively, during training, instead of using the ground truth pose as input to the subsequent components of the architecture 300, the architecture 300 may use the top modified target pose 362 determined by the model and a ground truth pose may be used to determine a loss based at least in part on a difference between the ground truth pose and a next predicted pose determined by the subsequent components of the architecture 300.

In an example where the position offset component 348 and the yaw offset component 350 determine a modification (i.e., lateral offset, longitudinal offset, and angle offset, whether zero or non-zero) for each target pose for which a set of target input features 342 was generated, these offsets may be applied to the respective target pose for which they were generated and output as part of the modified pose(s) 354. Additionally, the top target pose or top n target poses, ranked by final likelihood as determined by the outputs of the lane classification component 352 and the target classification component 346, may be output as the top target pose (or top n target poses) by final likelihood 356, where n is a positive integer.

Turning to FIG. 3C, the top modified target pose 362 or top n modified target pose may be determined based on the top target pose or top n target poses, all of which may be associated with a same future time (e.g., 3, 5, 8, 10 seconds in the future, or any other time as defined by a training hyperparameter). A modified pose that corresponds (i.e., is the pose that results from applying the offsets to the target pose) to the target pose classified as the top target pose or one of the top n target poses by likelihood may be output (as indicated by the target pose having a final likelihood that is the greatest from among all final likelihoods determined for the target poses or among the top n greatest final likelihoods, respectively).

The modified pose that corresponds with the target pose with the greatest final likelihood may be indicated as the predicted pose of the object at a particular future time (e.g., 5 seconds in the future, 8 seconds in the future 10 seconds in the future). The top n modified target poses may be used in an example where a predicted trajectory is determined. For example, this may allow the architecture 300 to determine the predicted trajectory on a more varied prior. In such an example, the final likelihood determined for each of the top n modified target poses may be output for processing by a second portion of the architecture 300 that determines the predicted trajectory. In an example where the predicted pose is output alone, the top modified target pose 362 may be output and the remainder of the architecture ignored.

In an example where the predicted pose (or top n predicted poses) is/are used to determine a predicted trajectory of the object, the predicted pose (i.e., the top modified target pose 362) or the top n modified target poses may be provided as input to a machine-learned model 364. In some examples, the machine-learned model 364 may be a recurrent neural network (RNN), such as a gated recurrent unit (GRU) or long short-term memory (LSTM) network. The machine-learned model 364 may additionally use a current pose 366 as input for determining the predicted trajectory, such as to iteratively determine a next predicted pose of the object from a current time up to or beyond the future time associated with the predicted pose (i.e., the top modified target pose 362). The machine-learned model 364 may additionally use a scene context vector determined by the scene context extraction component 310 for the current pose and/or the last determined predicted pose as input. Additionally or alternatively, the machine-learned model 364 may use the target pose(s) 344 as input to condition the output based at least in part on the target pose(s) 344. In some examples, hidden states of the machine-learned model 364 may be initialized using the track embedding 326.

In some examples, the machine-learned model 364 may additionally or alternatively use a candidate trajectory for controlling the vehicle 202 as input, so that the next predicted pose 368 may be conditioned on the candidate trajectory. This may allow the next predicted pose 368 to predict a reaction of the object to the candidate trajectory. The candidate trajectory may one of a set of candidate trajectories being explored by a tree search component to plan a trajectory to control the vehicle 202.

In some examples, the machine-learned model 364 and the components that follow the machine-learned model 364 in the architecture 300 pipeline may iteratively determine a next predicted pose of the object from a current pose of the object as predicted by the architecture 300 at a last iteration of the operations up to a future time before, at, or beyond the future time associated with the predicted pose (i.e., the top modified target pose 362). For example, the predicted pose may be associated with a first time, e.g,. 5 seconds in the future, and the machine-learned model 364 and subsequent components may determine a next predicted pose of the object for a next time interval (e.g., in 1 second intervals, in 0.5 second intervals) up until 3 seconds in the future, 5 seconds in the future 8 seconds in the future, or any other time in the future.

To give a practical non-limiting example, if the predicted pose is associated with 5 seconds in the future, the architecture 300 is designed with a hyperparameter defining the predicted trajectory to span from a current time to 8 seconds in the future, and another hyperparameter of the architecture 300 indicates that the architecture 300 is to generate a next predicted pose 368 at 1 second intervals, the architecture may determine a next predicted pose at 1 second into the future using the current pose 366, a scene context vector determined for the current pose 366, the predicted pose at 5 seconds into the future, and/or a scene context vector determined for the predicted pose at 5 seconds into the future; then the architecture 300 may determine a next predicted pose at 2 seconds into the future using the predicted pose at 1 second into the future, a scene context vector determined for the predicted pose at 1 second into the future, the predicted pose at 5 seconds into the future, and/or a scene context vector determined for the predicted pose at 5 seconds into the future; and so on until the predicted pose at 8 seconds into the future is reached, although for predictions past 5 seconds into the future the predicted pose at 5 seconds into the future may be dropped and not replaced or replaced by a coarse predicted pose determined by the coarse prediction component 370. Each pose predicted by the machine-learned model 364 may be aggregated together to form the predicted trajectory for the object over the time span specified according to the hyperparameters of the architecture 300.

Additionally or alternatively, the machine-learned model 364 may use the track embedding 326 as an input for all of the iterations of the architecture 300 predicting the next predicted pose. Additionally or alternatively, the machine-learned model 364 may use a coarse prediction 372 determined by the coarse prediction component 370 as part of predicting the next predicted pose 368. For example, the coarse prediction 372 may be a coarse path from a current time to a final time (e.g., 8 seconds into the future in the example given above) or a coarse next predicted pose for the next time step. In an iteration where the machine-learned model 364 is beyond the future time associated with the predicted pose (i.e., the top modified target pose 362 associated with 5 seconds into the future in the example given above), the machine-learned model 364 may use the target pose in place of the predicted pose at 5 seconds into the future. In other examples, the machine-learned model 364 may additionally or alternatively use the coarse path or the coarse next predicted pose to determine an orientation of a nearest (in distance) target pose from among the target pose(s) 344 at the time associated with the coarse path or the coarse next predicted position. This may include determining a shortest Euclidean distance from a portion of the coarse path associated with the next time step to a target pose or a shortest Euclidean distance from the coarse next predicted pose to a target pose. The machine-learned model 364 may use the orientation indicated by this nearest target pose as part of the input used by the machine-learned model 364. In some examples, using this orientation may act as a prior or to condition the output of the machine-learned model 364 in such a manner that the resultant predicted trajectory may be less likely to cut corners in the environment or otherwise collapse in inaccurate ways that don't accurately model object behavior.

In some examples, the coarse prediction component 370 may be a multi-layer perceptron, CNN, GNN, or the like that may determine the coarse prediction as a classification task by predicting likelihoods for the target pose(s) 344 or by outputting parameters of a spline, Bezier curve, piecewise linear or polynomial curve, or the like. In an example where the coarse prediction component 370 determines a course path as a classification task, the coarse prediction component 370 may determine a set of target pose(s) associated with different times or by outputting parameters of a spline, Bezier curve, piecewise linear or polynomial curve, or the like. The coarse prediction component 370 may determine these outputs based at least in part on the most recent pose (i.e., the current pose 366 at a first iteration or the next predicted pose 368 determined at the last iteration executed by the architecture), a scene context vector(s) (314) for the most recent pose, the predicted pose (i.e., the top modified target pose 362), and/or scene context vector (314) for that predicted pose.

The machine-learned model 364 may use the input data discussed above to determine a velocity and yaw rate 374 of the object at a next time step of the iteration or may determine the velocity and yaw rate 374 each as a series of velocities and yaw rates over time from the current time step to the next time step for which the next predicted pose is being determined. For example, the machine-learned model 364 may determine a change in position and/or change in orientation at a next future time. In some examples, the machine-learned model 364 may additionally or alternatively determine a covariance matrix associated with the velocity and yaw rate, indicating a covariance of each of the outputs to each other. In an example where the change in position is indicated in x- and y-coordinates and the change in orientation is indicated as an angle, this covariance matrix may be a 3×3 matrix. In some examples, the covariance matrix may be determined based at least in part on a Gaussian prior or may otherwise assume a Gaussian or other distribution of the changes. An integrator 376 may integrate the covariance matrix and/or the change in position and/or change in orientation to determine a multivariate Gaussian 378 distribution.

Additionally or alternatively, a kinematics model associated with an object detection classification determined to be associated with the object may use the covariance matrix and/or change in position/orientation to determine the Gaussian or to directly determine the next predicted pose of the object. For example, different kinematics models could be used for different object types, such as different kinematics models associated with articulating objects (e.g., a first kinematics model associated with vehicles that articulate toward the front of the vehicle, such as semi-trucks; a second kinematics model associated with vehicles such as busses that articulate in the middle), passenger vehicles, cyclists, pedestrians, etc.. A mean sampling component 380 may then determine a mean of the pose Gaussian 378 as the next predicted pose 368 or the kinematics model may determine the next predicted pose 368 using the velocity and yaw rate 374 and/or a covariance matrix associated therewith. The next predicted pose 368 may be concatenated to any previously generated next predicted poses as part of the predicted trajectory until the next predicted pose is associated with a final time. If the next predicted pose 368 isn't associated with the final time, the next predicted pose 368 may be used as a most recently predicted pose as input to the machine-learned model 364 to determine a next predicted pose for a subsequent time step as part of a further iteration of the architecture 300. However, during training a ground truth pose may be used as the current pose of the next prediction instead of the next predicted pose determined at the last iteration. This may prevent drift of the output and compounding errors (due to the recurrent nature of this process and the machine-learned model 364) that may complicate training the machine-learned model 364. That ground truth pose may be determined from subsequently received sensor data associated with a time corresponding with the future time for which the last next predicted pose was predicted.

In some examples, to train the architecture 300, a loss 382 may be determined based at least in part on a difference between the pose Gaussian 378 and a ground truth pose 384, which may be determined based on subsequently received sensor data. For example, as the vehicle 202 operates, it may have generated a predicted pose Gaussian 378 associated with a future time that becomes a current time. When that time comes, sensor data may be used by the perception component of the vehicle 202 to detect an observed (ground truth) pose of the object at the time for which the predicted pose Gaussian 378 was generated and may determine the loss 382. Note that the training data may be log data and there may be no need to wait for time to pass as the future pose of the object may have already been observed and recorded in the log data that is used as the training data. Determining the loss may be based at least in part on determining a likelihood, using the Gaussian 378, of the object being in the ground truth pose 384. In other words, if the Gaussian 378 is accurate, the ground ruth pose would indicate a mean of the Gaussian and a high likelihood (e.g., near 1). Further note that since the Gaussian may be multivariate to indicate distributions associated with each of the x-position, y-position, and the orientation, multiple losses may be determined and independently used to train the model or these losses may be aggregated as a single loss. In some examples, the loss 382 may be a negative log likelihood loss or any other suitable loss based at least in part on this likelihood. In some examples, the loss 382 may be determined by the architecture 300 or a training component executed by a remote computing device. The loss may then be backpropagated through the entire architecture or just to the machine-learned model 364 and/or coarse prediction model 370 and the components downstream therefrom. The backpropagation may comprise altering one or more parameters of the components through which the loss is backpropagated to reduce the loss if the training data were provided as input to the components again.

Similarly, returning to FIG. 3B, the architecture 300 or a training component executed by a remote computing device may determine a loss 386, loss 388, loss 390, and/or loss 392. Any of these losses may be a Huber loss, Cauchy loss, cross-entropy loss, or any other suitable loss and may be the same type of loss or a different type of loss per loss 386, loss 388, loss 390, and/or loss 392. For determining loss 386, loss 388, loss 390, and/or loss 392, the ground truth pose 358 or ground truth pose 360 is associated with a same time as the predictions indicated by the respective outputs of the architecture 300 used to determine such losses.

Determining the loss 386 may be based at least in part on a difference between a nearest target pose to the ground truth pose 358 or ground truth pose 360 and the top target pose output by target classification component 346. The loss 386 may additionally or alternatively be determined based at least in part on a difference between the ground truth pose 358 or ground truth pose 360 and the likelihoods output by the target classification component 346 for the different target pose(s). Determining the loss 388 may be based at least in part on a difference between a position indicated by the ground truth pose 358 or ground truth pose 360 and a position indicated by a modified pose 354 and may comprise a loss per modified pose, per the top n modified poses, or the top modified pose (i.e., the predicted pose). For example, the difference may be determined based at least in part on a Euclidean distance between the modified pose and the ground truth pose. Determining the loss 390 may be based at least in part on a difference between an orientation indicated by the ground truth pose 358 or ground truth pose 360 and an orientation indicated by a modified pose 354 and may comprise a loss per modified pose, per the top n modified poses, or the top modified pose (i.e., the predicted pose). For example, the difference may be determined based at least in part on a difference in angle indicated by the modified pose and the ground truth pose. Determining the loss 392 may be based at least in part on determining a difference between the lane or intersection associated with the ground truth pose 358 or ground truth pose 360 and the lane or intersection occupied by the top target pose, the top p target poses (multiple losses that may be used individually or aggregated by average or weighted averaging), or for all the likelihoods output by the lane classification component 352.

Note that, since the target pose(s) for which a lane prediction, target pose prediction, and offsets may be generated may be limited to those target pose(s) within a threshold distance of the object and/or the vehicle 202, losses may be suppressed or not calculated for any predictions associated with a target pose that is outside the threshold distance or for any predictions associated with a target pose predicted position offset that meets or exceeds a threshold position offset.

Example Processes

Figure 4A:
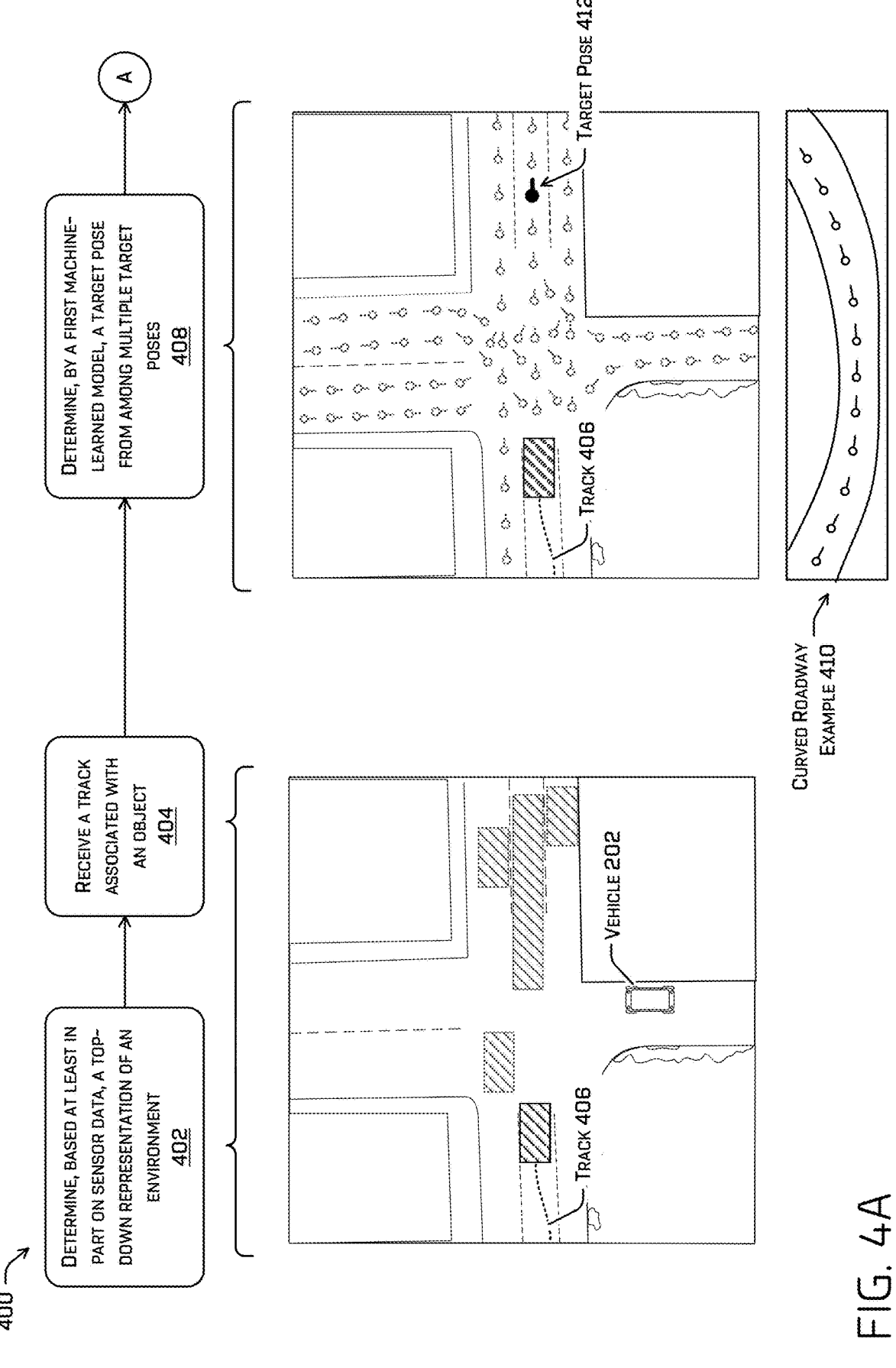
FIGS. 4A and 4B depict a pictorial flow diagram of an example process for predicting a future state of an object using the machine-learned model architecture discussed herein.
Figure 4B:
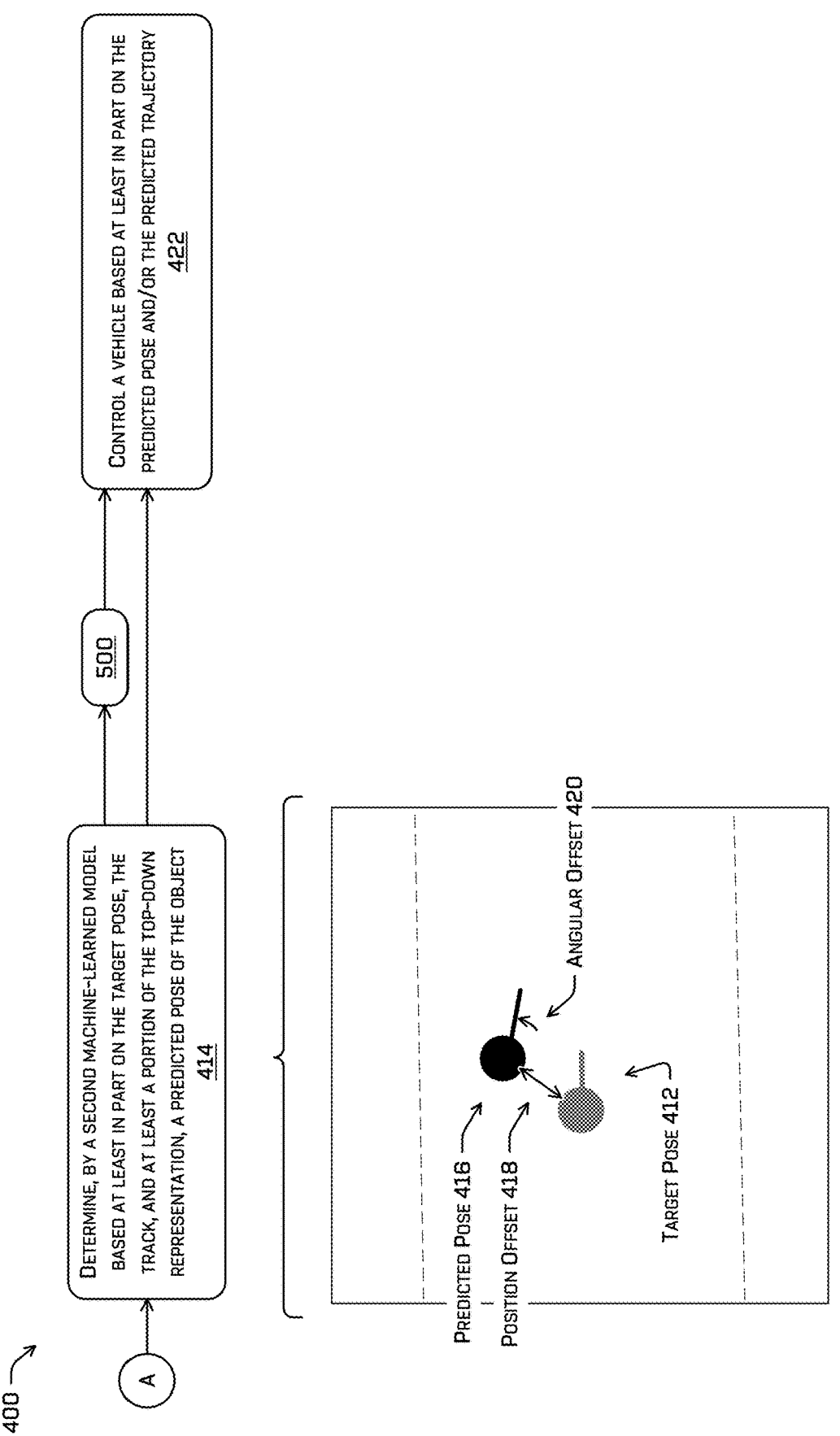

FIGS. 4A and 4B depict a pictorial flow diagram of an example process 400 for determining a predicted pose of an object and using that predicted pose to control a vehicle, such as vehicle 202. The object may be any dynamic object (e.g., object capable of movement or capable of self-locomotion) detected by a perception component of the vehicle

202. The predicted pose may be associated with a first future time. In some examples, example process 400 may further comprise example process 500, which may include determining a predicted trajectory of the object from a current time to a second future time that may be the same as or later than the first future time. Such a predicted trajectory may additionally or alternatively be used to control a vehicle. Example process 400 may be executed by a vehicle 202, such as by the architecture 300 stored, configured on, and/or executed by the vehicle 202. In some examples, some of the data used by the architecture 300 may be determined by a perception component of the vehicle 202.

These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, machine-learned models, and the like that perform particular functions or implement particular data types. The order in which the operations are described is not intended to be construed as a limitation, and any number of the described operations can be omitted or combined in any order and/or in parallel to implement the processes.

Turning to FIG. 4A, at operation 402, example process 400 may comprise determining, based at least in part on sensor data a top-down representation of an environment, according to any of the techniques discussed herein. In some examples, the top-down representation may be determined based at least in part on map data and/or object detection data. In an additional or alternate example, the map data may be a separate data structure from the top-down representation or may be extracted from the top-down representation. In such an example, operation 402 may additionally comprise receiving the map data, such as by retrieving it from memory or extracting it from the top-down representation. Object detection data may indicate a position, orientation, velocity (e.g., lateral, longitudinal, rotational, otherwise), acceleration (e.g., lateral, longitudinal, rotational, otherwise), an object classification (e.g., a type of object, such as public service object, vehicle, pedestrian, construction worker, etc. one or more classifications may be associated with an object), sensor data segmentation (e.g., mask, instance segmentation, semantic segmentation), a region of interest (ROI) (e.g., a two- or three-dimensional bounding box, bounding region) identifying a portion of sensor data associated with the object, object state (e.g., passenger loading/unloading, signaling turn, green/red light, siren active/inactive, speaker active/inactive), and/or a confidence score indicating a likelihood (e.g., posterior probability) that any such data is correct/accurate (there may be confidence score generated for each in some examples).

The top-down representation may indicate detected object data and/or map data. A portion of the top-down representation, such as a pixel or group of pixels, may indicate object data and/or map data by one or more channels. For example, a pixel may have different channel(s) or subdivided channel(s) that indicate to different object data that may include a global location of the pixel (i.e., a location in the environment that the pixel is associated with), whether an object is detected as existing at the pixel location or a likelihood that an object exists at the pixel/environment location, an orientation of an object indicated as existing at the location, a velocity and/or acceleration of the object, a classification associated with an object, whether an object is static or dynamic, a track associated with the object, a signage state (e.g., red light, green light, lane unavailable, directionality of a lane), other object state (e.g., left turn signal on, vehicle left side door open), and/or the like. The top-down representation may additionally or alternatively include channel (s) indicating map data, such as the existence of a roadway, a type of roadway junction (e.g., four-way controlled intersection, T-junction uncontrolled, six-way light-controlled intersection), signage existence and/or type (e.g., yield sign, traffic control light), sidewalk existence, region of interest (e.g., construction zone, crosswalk, parking location, passenger pickup/drop-off location), and/or the like. In some examples, multiple versions of the top-down representation environment may be determined in association with different times. For example, a first top-down representation may be associated with a current environment state and/or one or more second top-down representations may be associated with previous environment state(s).

In the depicted example, the object for which the predicted pose and/or predicted trajectory is being generated by the architecture 300 is indicated as a rectangle hashed with dark diagonal lines and other dynamic objects are indicated as rectangles hashed with light gray diagonal lines. Note that the architecture discussed herein may generate predicted pose(s) and/or predicted trajectory(s) for up to all of the dynamic objects in the example scene or within a threshold distance of the vehicle 202. In such an example, the architecture 300 is configured to determine these predicted pose(s) and/or predicted trajectory(s) in parallel by increasing the dimensions of the data discussed herein to indicate data determined in association with the different dynamic objects.

In some examples, operation 402 may additionally or alternatively comprise:

determining the map encoding by map encoder 328,
   determining the scene context feature map by the scene context component 308,
   determining scene context vector(s) by the scene context extraction component 310,
   determining the map encoding 332 based at least in part on the map encoding and the scene context vector(s) for the lane(s) and/or intersection(s) within a threshold distance of the vehicle 202 within the environment, and/or
   determining the lane and/or intersection orientations 334 based at least in part on the target pose(s) within a threshold distance of the vehicle (e.g., the target pose(s) may be pre-generated and stored as part of the map data).

At operation 404, example process 400 may comprise receiving a track associated with an object, according to any of the techniques discussed herein. In some examples, the track may indicate historical and/or current object data associated with the object for which the predicted pose and/or predicted trajectory is being determined. In some examples, a perception component of the vehicle 202 may determine the track. The track may indicate historical and/or current object position, orientation, velocity, acceleration, classification, and/or other state of that object (e.g., door/ aperture state, turning state, intent state such as activation turn signal, signage state that is relevant to the object). In some examples, one or more of the velocity, acceleration, classification, and/or other state data may be considered late fusion data, which may impact the manner in which the architecture determines the predicted pose and/or predicted trajectory as discussed herein (see intent input embedding

336). In the depicted example, a track 406 has been determined in association with the object. Although the depicted example merely indicates the track as a two-dimensional curve in space identifying a path in time, it is understood that this is a limitation of the drawings and that the track 406 may indicate additional data and may indicate such additional data as a function of time.

In some examples, operation 402 may additionally or alternatively comprise:

determining the track embedding 326 by the track encoder 324 based at least in part on the track 406;
   determining, by the scene context extraction component 310, the scene context vector(s) for the current and/or historical poses indicated in the pose data 312 of the track 406;
   determining the map encoding 330 based at least in part on the map encoding and the scene context vector(s) for the current and/or historical poses indicated in the pose data of the track 406;
   determining the intent input embedding 336 based at least in part on the track embedding 326, (optionally) any latent fusion features of the track 406, and the scene context vector(s) for the current and/or historical poses; and/or
   determining the feature representation 340 by the multi-layer perceptron 338.

At operation 408, example process 400 may comprise determining, by a first machine-learned model a target pose from among multiple target poses, according to any of the techniques discussed herein. FIG. 4A illustrates a target pose's position as a circle and its orientation as a line emanating from the circle. The techniques discussed herein may outperform other techniques for curved roadways, such as the curved roadway example 410, which further illustrates how target poses may appear in a curved roadway. In a scenario like that depicted in the curved roadway example 410 other techniques may result in a predicting that an object would move outside the roadway; whereas the architecture 300 discussed herein determines more accurate predictions that lie within the roadway in most cases (e.g., other than when a track associated with an object strongly indicates that the object is about to exit the roadway or the late fusion features of the track indicate the object is a pedestrian, animal, cyclist, or such similar object that may be more likely to go enter and exit the roadway). FIG. 4A illustrates the target pose 412 as the target pose having a greatest final likelihood in bold, whereas the other target poses are depicted in light gray and unbolded. Collectively, the target pose 412 and the target poses depicted in light gray may make up all or part of the target pose(s) 344 in this example.

Operation 408 may comprise determining the top target pose by final likelihood 356 and may comprise multiplying a likelihood the object will occupy the target pose determined by target classification component 346 with a likelihood the object will occupy a lane or intersection as determined by lane classification component 352. Operation 408 may additionally or alternatively comprise the intervening operations discussed regarding FIGS. 3A and 3B to determine the inputs for the target classification component 346 and the lane classification component 352. In some examples, operation 408 may additionally or alternatively comprise determining a top n target poses by final likelihood for use in determining a predicted trajectory of the object. In some examples, the first machine-learned model may comprise at least the target classification component 346 and the lane classification component 352.

In some examples, operation 408 may comprise determining a set of target input features 342 for up to each target pose within a threshold distance of the vehicle. Determining a set of target input features 342 for a target pose may comprise concatenating or otherwise aggregating a scene context vector determined by the scene extraction component 310 for the target pose, an indication of the target pose itself, the feature representation 340, the lane or intersection orientation for the portion of lane or intersection in which the target pose exists, and/or a portion of the map encoding 332 collocated with the target pose. In some examples, the target classification component 346 may determine a likelihood the object will occupy the target pose based at least in part on the set of target input features 342 determined for that target pose and the lane classification component 352 may determine a likelihood the object will occupy the lane or intersection encompassing this target pose based at least in part on the feature representation 340 and the map encoding 330.

Turning to FIG. 4B, at operation 414, example process 400 may comprise determining, by a second machine-learned model based at least in part on the target location, the track, and at least a portion of the top-down representation, a predicted pose 416 of the object, according to any of the techniques discussed herein. The second machine-learned model may comprise the position offset component 348 and the yaw offset component 350 and determining the predicted pose may comprise determining a position offset (e.g., a lateral and/or longitudinal distance) and a yaw offset. The position offset component 348 may determine the position offset based at least in part on the target input features determined for the target pose 412 and the yaw offset component 350 may determine the yaw offset based at least in part on the target input features determined for the target pose 412. Note that the position offset component 348 and the yaw offset component 350 may do this for every target pose for which a set of target input features 342 is generated (e.g., all the target poses within a threshold distance of the vehicle 202 and/or the object), but only those offsets associated with the top target pose by final likelihood or top n target poses by final likelihood (as discussed above) is output/used.

Determining the predicted pose 416 may comprise adding the position offset 418 (which may include a positive, zero, or negative lateral offset and a positive, zero, or negative longitudinal offset) to the position indicated by the target pose 412 and adding the angular offset 420 (which may be positive, zero, or negative) to the orientation indicated by the target pose 412.

In an example where the architecture 300 is instructed or configured to also generate a predicted trajectory of the object, example process 400 may continue to example process 500. Regardless, example process 400 and/or example process 500 may continue to operation 422.

At operation 422, example process 400 may comprise controlling a vehicle (e.g., vehicle 202) based at least in part on the predicted pose and/or the predicted trajectory, according to any of the techniques discussed herein. In some examples, the operations discussed herein may comprise including a candidate action for controlling the vehicle 202 as part of the object detection data indicated in the top-down representation 302. Accordingly, the predicted pose and/or predicted trajectory for the object may be conditioned on the candidate action of the vehicle. Operation 422 may comprise determining a trajectory for the vehicle to implement based at least in part on the predicted pose and/or predicted trajectory as part of a tree search algorithm (e.g., A\*, D\*, Djikstra's algorithm) that determines a trajectory for controlling the vehicle 202. See U.S. patent application Ser. No. 18/084,419, filed Dec. 19, 2022, the entirety of which is incorporated by reference herein for all purposes. In such an example, the final time associated with a predicted trajectory and/or the future time associated with the predicted pose may be set based on a next time step for which the tree search is searching for a candidate action to further explore or include as at least part of a trajectory for controlling the vehicle. As an example, the predicted pose and/or predicted trajectory determined for the object may be used to determine a cost associated with a candidate action for controlling the vehicle and a lowest cost candidate action may be selected as the trajectory (or part of the trajectory) for controlling the vehicle.

For example, the tree search may determine an action for the vehicle to carry out based at least in part on determining costs associated with different candidate actions and selecting one of the candidate actions based on a cost associated therewith from among the multiple candidate actions and their respective costs. Each of the different candidate actions may be individually scored using cost functions associated with different priorities for operating the vehicle, such as safety, comfort, progress, etc. The cost for a candidate action may be based at least in part on a likelihood of object impact, safety, vehicle progress along a route, passenger comfort, drive dynamics, and/or the like. Some of these costs may be based at least in part on the predicted pose and/or predicted trajectory. For example, a safety objective may be associated with multiple different sub-costs that may be based at least in part on the proximity to the object that a candidate action would bring the vehicle to the predicted pose and/or predicted trajectory, minimum braking distance or maximum braking force to avoid the predicted pose and/or predicted trajectory, conformance to rules of the road, and/or the like, multiple of which may be based at least in part on the predicted pose and/or predicted trajectory. A passenger comfort objective may be associated with determining an acceleration or jerk associated with the candidate action and/or one or more lateral and/or longitudinal velocity, acceleration, and/or jerk thresholds. The cost may be based at least in part on the candidate action itself and/or the state indicated by a predicted state of the environment associated with a prediction node of the tree search determined, in part, by the predicted pose and/or predicted trajectory.

Figure 5:
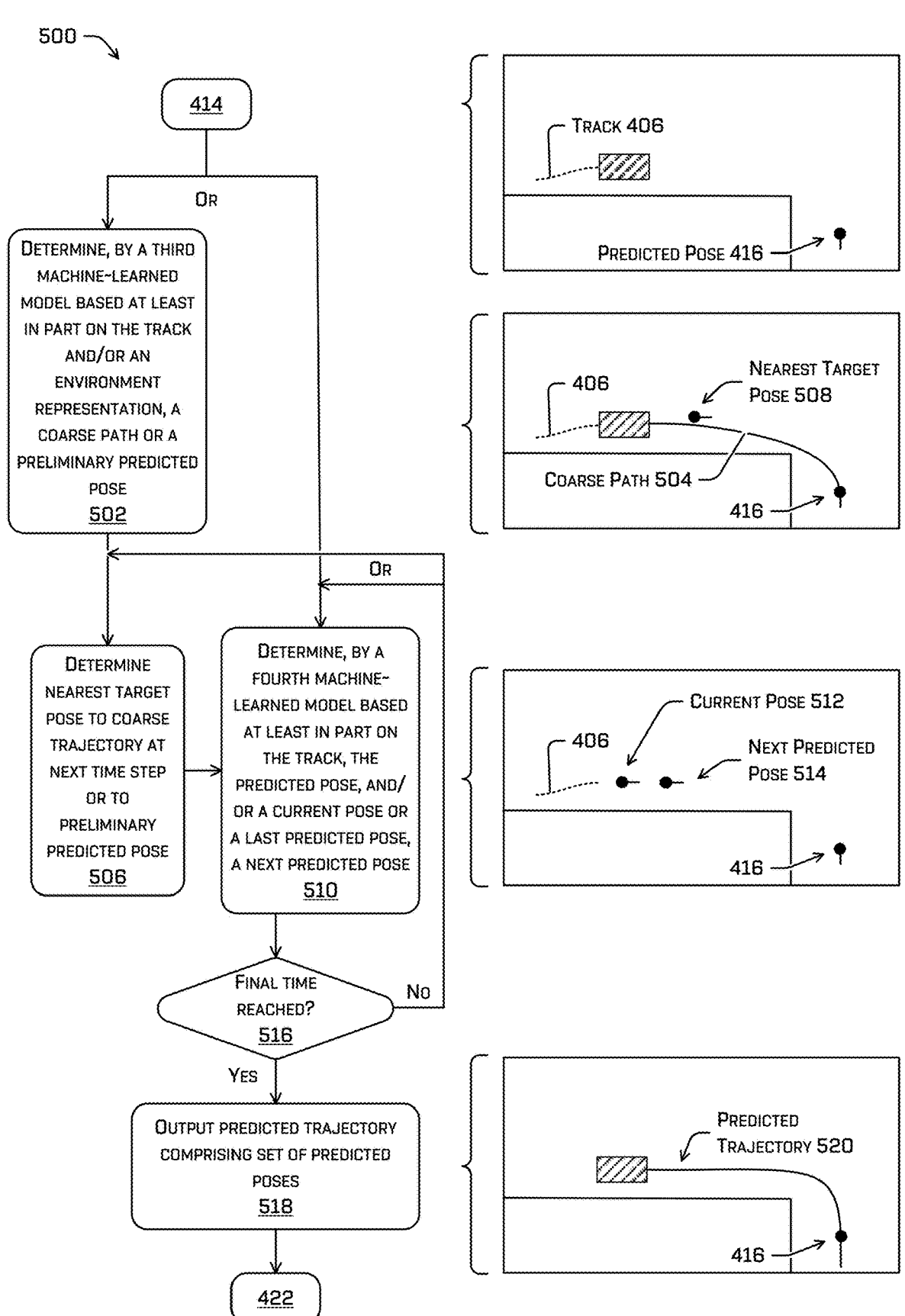
FIG. 5 depicts a pictorial flow diagram of an example process for determining a predicted trajectory of an object using the machine-learned model architecture and the predicted future state discussed herein.

FIG. 5 depicts a pictorial flow diagram of an example process 500 for determining a predicted trajectory of an object, such as the object discussed in FIGS. 4A and 4B. In some examples, the example process 500 may determine the predicted trajectory based at least in part on the predicted pose 416 and based at least in part on at least some of the intermediate data determined as discussed regarding example process 400 and/or architecture 300. The predicted trajectory may discretely indicate the predicted trajectory by indicating predicted poses of the object in association with respective times from a current time to a final future time that may be the same or later than the future time for which the predicted pose was generated. Additionally or alternatively, the predicted trajectory may be indicated continuously, such as by fitting a line, curve, or the like to discrete predicted poses. Regardless, the predicted poses may implicitly indicate the object's predicted velocity and/or acceleration based on the predicted poses being indicated as a function of time. Example process 500 may be executed by a vehicle 202, such as by the architecture 300 stored, configured on, and/or executed by the vehicle 202. In some examples, some of the data used by the architecture 300 may be determined a perception component of the vehicle 202.

Example process 500 may comprise iteratively determining a next predicted pose of the object for a next time step in a series of time steps from a current time to a final time. The time steps may be spaced at the same or different time intervals. For example, the time interval may be the same (e.g., a next predicted pose may be determined for time steps of 1 second from a current time to the final time) or may decrease or increase with time. For example, in an example where the time interval increases, at a first iteration of example process 500, the example process 500 may determine a first next predicted pose of the object at 0.25 seconds in the future; at a second iteration of example process 500, the example process 500 may determine a second next predicted pose of the object at 0.53 seconds in the future; at a third iteration of example process 500, the example process 500 may determine a third next predicted pose of the object at 1.1 seconds in the future; at a fourth iteration of example process 500, the example process 500 may determine a fourth next predicted pose of the object at 2.32 seconds in the future; and so on until the final time is reached. Whereas, if the time interval is constant, next predicted poses of the object may determined for 1, 2, 3, 4 seconds and so on until a final time is reached. The final time may be the same time or an earlier or later time than the future time associated with the predicted pose 416, although in examples where the final time is earlier in time than the future time associated with the predicted pose 416, the final time will still be a future time later than a time associated with a current pose of the object.

Example process 500 may optionally comprise determining a coarse prediction of the object's movement, either as a coarse path or a preliminary predicted pose for a next time step of the iteration. For example, at operation 502, example process 500 may comprise determining, by a third machine-learned model based at least in part on the track, the predicted pose 416, a most-recently generated next predicted pose or the current pose, and/or an environment representation (e.g., the top-down representation; a scene context vector associated with the track, the predicted pose 416, the most recent determined next predicted pose or the current pose if the iteration is at a first iteration, or the like), according to any of the techniques discussed herein. For example, operation 502 may comprise determining a coarse prediction 372 by the coarse prediction component 370. The third machine-learned model may comprise the coarse prediction component 370. FIG. 5 depicts the coarse prediction as a coarse path 504, which may be determined once and used throughout example process 500, as discussed herein, although it is understood that the coarse prediction may additionally or alternatively comprise a coarse predicted pose associated with the next time step for which a next predicted pose is being generated and may be a preliminary predicted pose. Either way, operation 506 may use the coarse prediction may use either or both types of coarse predictions to determine an orientation that may be used to determine a next predicted pose.

At operation 506, example process 500 may comprise determining a nearest target pose 508 to the coarse path at a next time step of the iteration or the nearest target pose 508 to a coarse (preliminary) predicted pose determined by the third machine-learned model, according to any of the techniques discussed herein. In some examples, operation 506 may be an optional operation that may be conducted if a coarse prediction is generated at operation 502. Determining a nearest target pose 508 to the coarse path may comprise determining such a target pose 508 by a regression machine-learned model that determines an estimated displacement along the coarse path and using that displacement to determine the nearest target pose from among the target pose(s) 344 to the location along the coarse path defined by the displacement. Additionally or alternatively, determining the nearest target pose 508 based at least in part on the coarse path may comprise determining, by a classification machine-learned model, which target pose from among the target pose(s) 344 is most likely to be nearest to the object pose at a next time step. Either way, either of these models may use the coarse path, the predicted pose 416, and a next predicted pose determined at a last iteration of example process 500 or the current pose if this is the first iteration of example process 500. Either of these models may additionally or alternatively use a track or track embedding and scene context vector(s) determined for any of the other input data by the scene context extraction component 310 to determine the nearest target pose 508.

Determining the nearest target pose 508 based on a coarse (preliminary) predicted pose for a next time step may comprise determining a nearest target pose from among the target pose(s) 344 based on determining the target pose that indicates a position that is a minimum Euclidean distance form a distance indicated by the coarse predicted pose.

Regardless of whether the coarse prediction includes a coarse path or a coarse predicted pose, operation 506 may comprise determining an orientation indicated by the nearest target pose 508 and using that orientation as input to the fourth machine-learned model as part of determining the next predicted pose associated with a next time interval for which the fourth machine-learned model is determining a next predicted pose.

At operation 510, example process 500 may comprise determining, by a fourth machine-learned model based at least in part on the track, the predicted pose, and/or a current pose or a last predicted pose (i.e., the next predicted pose determined at a last iteration of the example process 500), a next predicted pose, according to any of the techniques discussed herein. For example, operation 510 may be based at least in part on data associated with the current pose of the object at a first iteration of the example process 500 (e.g., where the example process 500 has yet to determine a first next predicted pose associated with a first time step). For subsequent iterations of example process 500, operation 510 may be based at least in part on data associated with a next predicted pose determined at a last iteration of example process 500. For example, the next predicted pose 514 may have been determined by the fourth machine-learned model based at least in part on data associated with the current pose 512 of the object (i.e., either a current pose of the object at a current time or the last pose predicted by the iterative process at a last time step). The next predicted pose 514 may be associated with a next time step into the future (e.g., 1 second into the future) and may be used as the current pose to determine a subsequent next predicted pose for a second time step (e.g., 2 seconds into the future) and so on.

The fourth machine-learned model may comprise the machine-learned model 364 and determining the next predicted pose may further comprise the operations of the machine-learned model 364, the integrator 376, and/or the mean sampling component 380 as discussed regarding FIG. 3C. In some examples, the fourth machine machine-learned model may determine the next predicted pose based at least in part on the track by using a track embedding as part of the input or initializing hidden states of the machine-learned model 364 using the track. The latter may be used in examples where the machine-learned model 364 is some type of recurrent neural network (RNN) and the track embedding does not need to be used as input since an RNN's hidden states may be updated upon subsequent iterations of the example process 500, according to the configuration of an RNN. This functionally serves to update the hidden states to further indicate an updated track of the object that further includes the next predicted pose(s) determined by the example process 500 determined so far as part of the iterations of the example process 500.

In some examples, the fourth machine-learned model may determine the next predicted pose of the object based at least in part on determining a velocity and/or yaw rate or probability distributions associated therewith. The fourth machine-learned model may determine the velocity and yaw rate of the object (or probability distributions associated therewith) based at least in part on one or more of:

A track embedding used as input or based on hidden states of the fourth machine-learned model that have been initialized based at least in part on the track embedding;

An orientation of a nearest target pose determined based on a coarse prediction;

The predicted pose 416 (determined as part of example process 400) or top n predicted poses determined according to ranking their final likelihood (determined as part of example process 400);

The nearest target pose determined based on a coarse prediction as a replacement for the predicted pose 416 for any time steps that are later than a future time associated with the predicted pose 416; and/or Scene context vector(s) determined by the scene context extraction component 310 for any of the input data discussed above.

Operation 510 may further comprise integrating the velocity and yaw rate 374 (or probability distributions associated therewith) determined by the fourth machine-learned model to determine pose Gaussian(s), the mean(s) of which may be sampled to determine the next predicted pose of the object for the time step associated with the current iteration of example process 500

At operation 516, example process 500 may comprise determine whether the next predicted pose determined by operation 510 as part of a most recent iteration of the example process 500 is associated with the final time for which the predicted trajectory is to be generated, according to any of the techniques discussed herein. If the next predicted pose determined by operation 510 as part of a most recent iteration of the example process 500 is associated with a future time earlier than the final time, example process 500 may return to operation 510 to determine a next predicted pose for a subsequent time step using the next predicted pose determined by operation 510 at the last (most recent) iteration as input as discussed above. Additionally or alternatively, if the next predicted pose determined by operation 510 as part of a most recent iteration of the example process 500 is associated with a future time earlier than the final time, example process 500 may return to operation 502 and/or operation 506 to determine a new nearest target pose for the next iteration/subsequent time step. For example, where the course prediction comprises a coarse predicted pose, example process 500 may return to operation 502 and subsequently operation 506 to determine a nearest target pose to the new coarse pose predicted at operation 502. Whereas if the course prediction only includes a coarse path, example process 500 may return to operation 506 to determine a new nearest target pose since a new coarse path need not be generated again at operation 502. In additional or alternate examples, example process 500 can return to operation 502 to determine a new coarse path before returning to operation 506 to determine the nearest target pose.

If the next predicted pose determined by operation 510 as part of a most recent iteration of the example process 500 is associated with a future time equal to or later than the final time, example process 500 may continue to operation 518.

At operation 518, example process 500 may comprise outputting a predicted trajectory comprising a set of predicted poses, according to any of the techniques discussed herein. For example, as example process 500 iteratively determines new predicted poses, each of these next predicted poses may be concatenated to the set of predicted poses as part of the predicted trajectory. In some examples, each predicted pose in the set of predicted poses may be associated with a different future time. Operation 518 may output the predicted trajectory as a set of predicted poses, i.e., as a set of discrete predicted poses, although in additional or alternate examples, like the one depicted in FIG. 5, operation 518 may comprise using the set of predicted poses to determine a continuous representation of the predicted trajectory, like predicted trajectory 520. Predicted trajectory 520 is an example of a continuous representation of the position portion of the predicted trajectory 520. In practice, a continuous representation of the predicted trajectory may additionally indicate a continuous representation of the predicted orientations indicated by the predicted trajectory. Determining a continuous representation of the predicted trajectory may comprise fitting a first curve, spline, Bezier curve, polynomial, piecewise linear or polynomial curve, or the like to the position data indicated by the set of predicted states and a second curve, spline, Bezier curve, polynomial, piecewise linear or polynomial curve, or the like to the orientation data indicated by the set of predicted states. In some examples, example process 500 may continue to operation 422, at which the vehicle may determine a trajectory for controlling the vehicle based at least in part on the predicted trajectory, as discussed in more detail above regarding operation 422.

EXAMPLE CLAUSES

A: A system comprising: one or more processors; and a non-transitory memory storing processor-executable instructions that, when executed by the one or more processors, cause the system to perform operations comprising: determining, based at least in part on sensor data, a top-down representation of an environment in which a vehicle is operating, the top-down representation including a detection of an object in the environment; receiving a track associated with the object indicating a current and historical at least one of position, orientation, velocity, or acceleration of the object; receiving a set of target poses associated with one or more roadways indicated by map data associated with the environment; determining, by a first machine-learned model and based at least in part on the track and at least a portion of the top-down representation, a target pose from among the set of target poses, the target pose indicating a position in the environment and a lane orientation of a lane associated with the target pose; determining, by a second machine-learned model based at least in part on the target pose, the track, and at least the portion of the top-down representation, at least one a longitudinal offset from the position, a lateral offset from the position, or an angular offset from the lane orientation; determining a predicted pose associated with the object, the predicted pose comprising a future position and future orientation determined based on the target pose and at least one of the longitudinal offset from the position, the lateral offset from the position, or the angular offset from the lane orientation; and controlling the vehicle based at least in part on the predicted pose of the object.

B: The system of paragraph A, wherein: the target pose further indicates the lane associated with the target pose from among multiple lanes; and the lane indicated by the target pose is an additional input to the second machine-learned model.

C: The system of paragraph B, wherein: the operations further comprise: determining a graph representation of the multiple lanes, wherein a node represents the lane and an edge between the node and one or more additional node indicates a relation of the lane to one or more other lanes in the environment; and determining, by an encoder based at least in part on the graph representation, an embedding associated with the lane; and determining the predicted pose based at least in part on the lane comprises providing the embedding to the second machine-learned model as input.

D: The system of any one of paragraphs A-C, wherein: controlling the vehicle based at least in part on the predicted pose comprises determining a predicted trajectory of the object by a third machine-learned model based at least in part on the predicted pose and the track; the predicted pose is associated with a first future time; and the predicted trajectory indicates a set of poses of the object from a current pose of the object to a final pose of the object at the first future time or a second future time later than the first future time.

E: The system of any one of paragraphs A-D, wherein determining the target pose comprises: determining, by the first machine-learned model, a first likelihood that the object will occupy the lane in the future; determining, by the first machine-learned model, a second likelihood that the object will occupy the target pose in the future; determining a third likelihood by multiplying the first likelihood by the second likelihood; and determining that the third likelihood is a maximum likelihood from among other target poses and lane combinations.

F: The system of any one of paragraphs A-E, wherein controlling the vehicle based at least in part on the predicted pose comprises determining a candidate action for implementation by the vehicle from among multiple candidate actions based at least in part on the predicted pose.

G: One or more non-transitory computer-readable media comprising processor-executable instructions that, when executed by one or more processors, cause the one or more processors to perform operations comprising: receiving a top-down representation of an environment in which a vehicle is operating, the top-down representation including a detection of an object in the environment; receiving a track associated with the object indicating a current and historical at least one of position, orientation, velocity, or acceleration of the object; receiving a set of target poses associated with one or more roadways indicated by map data associated with the environment; determining, by a first machine-learned model and based at least in part on the track and at least a portion of the top-down representation, a target pose from among the set of target poses, the target pose indicating a position within a lane and a lane orientation; determining, by a second machine-learned model based at least in part on the position, orientation, the track, and at least the portion of the top-down representation, a modification to the target pose as a predicted pose of the object; and controlling the vehicle based at least in part on the predicted pose of the object.

H: The one or more non-transitory computer-readable media of paragraph G, wherein the modification comprises at least one of a longitudinal offset from the position, a lateral offset from the position, or an angular offset from the lane orientation.

I: The one or more non-transitory computer-readable media of either paragraph G or H, wherein: the target pose further indicates the lane associated with the target pose from among multiple lanes; the operations further comprise: determining a graph representation of the multiple lanes, wherein a node represents the lane and an edge between the node and one or more additional node indicates a relation of the lane to one or more other lanes in the environment; and determining, by an encoder based at least in part on the graph representation, an embedding associated with the lane; and determining the predicted pose based at least in part on the lane comprises providing the embedding to the second machine-learned model as input.

J: The one or more non-transitory computer-readable media of any one of paragraphs G-J, wherein: controlling the vehicle based at least in part on the predicted pose comprises determining a predicted trajectory of the object by a third machine-learned model based at least in part on the predicted pose and the track; the predicted pose is associated with a first future time; and the predicted trajectory indicates a set of poses of the object from a current pose of the object to a final pose of the object at the first future time or a second future time later than the first future time.

K: The one or more non-transitory computer-readable media of any one of paragraphs G-J, wherein determining the target pose comprises: determining, by the first machine-learned model, a first likelihood that the object will occupy the lane in the future; determining, by the first machine-learned model, a second likelihood that the object will occupy the target pose in the future; determining a third likelihood by multiplying the first likelihood by the second likelihood; and determining that the third likelihood is a maximum likelihood from among other target poses and lane combinations.

L: The one or more non-transitory computer-readable media of any one of paragraphs G-K, wherein determining the predicted pose by the second machine-learned model is further based at least in part on a candidate action for controlling the vehicle.

M: The one or more non-transitory computer-readable media of any one of paragraphs G-L, wherein determining the target pose by the first machine-learned model and based at least in part on at least the portion of the top-down representation comprises: determining, by a first machine-learned component of the first machine-learned model based at least in part on the top-down representation, a feature map; determining a portion of the feature map associated with a region surrounding a current position of the object; and providing the portion of the feature map as input to one or more remaining machine-learned components of the first machine-learned model.

N: The one or more non-transitory computer-readable media of any one of paragraphs G-M, wherein determining the target pose by the first machine-learned model and based at least in part on the track comprises: determining, by an encoder of the first machine-learned model based at least in part on the track, an embedding; and providing the embedding as input to one or more remaining machine-learned components of the first machine-learned model.

O: A method comprising: receiving a top-down representation of an environment in which a vehicle is operating, the top-down representation including a detection of an object in the environment; receiving a track associated with the object indicating a current and historical at least one of position, orientation, velocity, or acceleration of the object; receiving a set of target poses associated with one or more roadways indicated by map data associated with the environment; determining, by a first machine-learned model and based at least in part on the track and at least a portion of the top-down representation, a target pose from among the set of target poses, the target pose indicating a position within a lane and a lane orientation; determining, by a second machine-learned model based at least in part on the position, orientation, the track, and at least the portion of the top-down representation, a modification to the target pose as a predicted pose of the object; and controlling the vehicle based at least in part on the predicted pose of the object.

P: The method of paragraph O, wherein the modification comprises at least one of a longitudinal offset from the position, a lateral offset from the position, or an angular offset from the lane orientation.

Q: The method of either paragraph O or P, wherein: the target pose further indicates the lane associated with the target pose from among multiple lanes; the method further comprises: determining a graph representation of the multiple lanes, wherein a node represents the lane and an edge between the node and one or more additional node indicates a relation of the lane to one or more other lanes in the environment; and determining, by an encoder based at least in part on the graph representation, an embedding associated with the lane; and determining the predicted pose based at least in part on the lane comprises providing the embedding to the second machine-learned model as input.

R: The method of any one of paragraphs O-Q, wherein determining the target pose comprises: determining, by the first machine-learned model, a first likelihood that the object will occupy the lane in the future; determining, by the first machine-learned model, a second likelihood that the object will occupy the target pose in the future; determining a third likelihood by multiplying the first likelihood by the second likelihood; and determining that the third likelihood is a maximum likelihood from among other target poses and lane combinations.

S: The method of any one of paragraphs O-R, wherein determining the predicted pose by the second machine-learned model is further based at least in part on a candidate action for controlling the vehicle.

T: The method of any one of paragraphs O-S, wherein: determining the target pose by the first machine-learned model and based at least in part on at least the portion of the top-down representation comprises: determining, by a first machine-learned component of the first machine-learned model based at least in part on the top-down representation, a feature map; determining a portion of the feature map associated with a region surrounding a current position of the object; and providing the portion of the feature map as input to one or more remaining machine-learned components of the first machine-learned model; and determining the target pose by the first machine-learned model and based at least in part on the track comprises: determining, by an encoder of the first machine-learned model based at least in part on the track, an embedding; and providing the embedding as input to one or more remaining machine-learned components of the first machine-learned model.

U: A system comprising: one or more processors; and non-transitory memory storing processor-executable instructions that, when executed by the one or more processors, cause the system to perform operations comprising: determining, based at least in part on sensor data, a current pose and a first predicted pose of an object in an environment in which a vehicle is operating, wherein the first predicted pose indicates a first predicted position and a first predicted orientation of the object at a first future time; receiving a track associated with the object indicating a current and historical at least one of position, orientation, velocity, or acceleration of the object; determining a predicted trajectory of the object based at least in part on iteratively: determining, by a first machine-learned model, a next predicted pose of the object indicating a second predicted position and a second predicted orientation of the object at a second future time after a time associated with the current pose, wherein determining the next predicted pose by the first machine-learned model is based at least in part on the track, the first predicted pose, a lane orientation of a target pose the object is predicted to occupy at the second future time, and the current pose or a last predicted pose output by the first machine-learned model at a previous iteration; and controlling the vehicle based at least in part on the predicted trajectory of the object.

V: The system of paragraph U, wherein the operations further comprise determining the lane orientation based at least in part on: determining, by a second machine-learned model and based at least in part on the track and the current pose or the last predicted pose, the target pose, wherein the target pose indicates a location in the environment and the lane orientation.

W: The system of either paragraph U or V, wherein the operations further comprise determining the lane orientation based at least in part on: determining a coarse predicted trajectory by a second machine-learned model based at least in part on the track, the current pose, and at least one of the first predicted pose or a top-down representation of the environment; and determining, based at least in part on the coarse path, a nearest target pose to a portion of the coarse path at the second future time, wherein: the nearest target pose is the target pose, the nearest target pose is determined from among multiple target poses, and the nearest target pose indicates a location in the environment and the lane orientation.

X: The system of either any one of paragraphs U-W, wherein training the first machine-learned model and the second machine-learned model comprises: determining, based at least in part on sensor data received from a time associated with the current pose to a time associated with the first future time, an observed path of the object; determining a loss based at least in part on a difference between the predicted trajectory and the observed path; and altering at least one of a first parameter of the first machine-learned model or a second parameter of the second machine-learned model to reduce the loss.

Y: The system of any one of paragraphs U-X, wherein determining the first predicted pose comprises: determining, based at least in part on sensor data, a top-down representation of the environment, the top-down representation including a detection of the object in the environment; determining, by a second machine-learned model and based at least in part on the track and at least a portion of the top-down representation, a second target pose from among multiple target poses, the second target pose indicating a second position in the environment and a second lane orientation of a lane associated with the second target pose; and determining, by a second machine-learned model based at least in part on the second target pose, the track, and at least the portion of the top-down representation, the first predicted pose, the first predicted pose determined based on at least one of a longitudinal offset from the second position, a lateral offset from the second position, or an angular offset from the second lane orientation determined by the second machine-learned model.

Z: The system of any one of paragraphs U-Y, wherein determining the next predicted pose comprises: determining, by a first sub-machine-learned model of the first machine-learned model based at least in part on the track, the predicted pose, the lane orientation, and the current pose or the last predicted pose, a velocity and yaw rate of the object; determining, by an integration component of the first machine-learned model and based at least in part on the velocity and the yaw rate, a probability distribution; and determining, based at least in part on determining a mean from the probability distribution, the next predicted pose.

AA: The system of any one of paragraphs U-Z, wherein determining the next predicted pose by the first machine-learned model is based at least in part on a second lane orientation of a second target pose nearest to the last predicted pose instead of the lane orientation of the target pose the object is predicted to occupy at the second future time.

AB: One or more non-transitory computer-readable media comprising processor-executable instructions that, when executed by one or more processors, cause the one or more processors to perform operations comprising: determining, based at least in part on sensor data, a current pose and a first predicted pose of an object in an environment in which a vehicle is operating; receiving a track associated with the object indicating a current and historical at least one of position, orientation, velocity, or acceleration of the object; determining a predicted trajectory of the object based at least in part on: determining, by a first machine-learned model based at least in part on the track, a next predicted pose of the object indicating a third predicted position and a second predicted orientation of the object at the second future time, wherein determining the next predicted pose by the first machine-learned model is based at least in part on the first predicted pose, a second predicted pose output by the first machine-learned model associated with a third future time before the second future time, and a lane orientation of a target pose nearest the second predicted pose; and controlling the vehicle based at least in part on the predicted trajectory of the object.

AC: The one or more non-transitory computer-readable media of paragraph AB, wherein the operations further comprise determining the lane orientation based at least in part on: determining, by a second machine-learned model and based at least in part on the track and the current pose or the last predicted pose, the target pose, wherein the target pose indicates a location in the environment and the lane orientation.

AD: The one or more non-transitory computer-readable media of either paragraph AB or AC, wherein determining the next predicted pose by the first machine-learned model is further based at least in part on a second lane orientation of a second target pose the object is predicted to occupy at the second future time.

AE: The one or more non-transitory computer-readable media of paragraph AD, wherein the operations further comprise determining the second lane orientation based at least in part on: determining a coarse predicted trajectory by a second machine-learned model based at least in part on the track, the current pose, and at least one of the first predicted pose or a top-down representation of the environment; and determining, based at least in part on the coarse path, a second nearest target pose to a portion of the coarse path at the second future time, wherein: the second nearest target pose is the target pose, the second nearest target pose is determined from among multiple target poses, and the second nearest target pose indicates a location in the environment and the second lane orientation.

AF: The one or more non-transitory computer-readable media of any one of paragraphs AB-AE, wherein determining the first predicted pose comprises: determining, based at least in part on sensor data, a top-down representation of the environment, the top-down representation including a detection of the object in the environment; determining, by a second machine-learned model and based at least in part on the track and at least a portion of the top-down representation, a second target pose from among multiple target poses, the second target pose indicating a second position in the environment and a second lane orientation of a lane associated with the second target pose; and determining, by a second machine-learned model based at least in part on the second target pose, the track, and at least the portion of the top-down representation, the first predicted pose, the first predicted pose determined based on at least one of a longitudinal offset from the second position, a lateral offset from the second position, or an angular offset from the second lane orientation determined by the second machine-learned model.

AG: The one or more non-transitory computer-readable media of any one of paragraphs AB-AF, wherein determining the next predicted pose comprises: determining, by a first sub-machine-learned model of the first machine-learned model based at least in part on the track, the predicted pose, the lane orientation, and the current pose or the last predicted pose, a velocity and yaw rate of the object; determining, by an integration component of the first machine-learned model and based at least in part on the velocity and the yaw rate, a probability distribution; and determining, based at least in part on determining a mean from the probability distribution, the next predicted pose.

AH: A method comprising: determining, based at least in part on sensor data, a current pose and a first predicted pose of an object in an environment in which a vehicle is operating; receiving a track associated with the object indicating a current and historical at least one of position, orientation, velocity, or acceleration of the object; determining a predicted trajectory of the object based at least in part on: determining, by a first machine-learned model based at least in part on the track, a next predicted pose of the object indicating a third predicted position and a second predicted orientation of the object at the second future time, wherein determining the next predicted pose by the first machine-learned model is based at least in part on the first predicted pose, a second predicted pose output by the first machine-learned model associated with a third future time before the second future time, and a lane orientation of a target pose nearest the second predicted pose; and controlling the vehicle based at least in part on the predicted trajectory of the object.

AI: The method of paragraph AH, further comprising determining the lane orientation based at least in part on: determining, by a second machine-learned model and based at least in part on the track and the current pose or the last predicted pose, the target pose, wherein the target pose indicates a location in the environment and the lane orientation.

AJ: The method of either paragraph AH or AI, wherein determining the next predicted pose by the first machine-learned model is further based at least in part on a second lane orientation of a second target pose the object is predicted to occupy at the second future time.

AK: The method of paragraph AJ, further comprising determining the second lane orientation based at least in part on: determining a coarse predicted trajectory by a second machine-learned model based at least in part on the track, the current pose, and at least one of the first predicted pose or a top-down representation of the environment; and determining, based at least in part on the coarse path, a second nearest target pose to a portion of the coarse path at the second future time, wherein: the second nearest target pose is the target pose, the second nearest target pose is determined from among multiple target poses, and the second nearest target pose indicates a location in the environment and the second lane orientation.

AL: The method of any one of paragraphs AH-AK, wherein determining the first predicted pose comprises: determining, based at least in part on sensor data, a top-down representation of the environment, the top-down representation including a detection of the object in the environment; determining, by a second machine-learned model and based at least in part on the track and at least a portion of the top-down representation, a second target pose from among multiple target poses, the second target pose indicating a second position in the environment and a second lane orientation of a lane associated with the second target pose; determining, by a second machine-learned model based at least in part on the second target pose, the track, and at least the portion of the top-down representation, the first predicted pose, the first predicted pose determined based on at least one of a longitudinal offset from the second position, a lateral offset from the second position, or an angular offset from the second lane orientation determined by the second machine-learned model.

AM: The method of any one of paragraphs AH-AL, wherein determining the next predicted pose comprises: determining, by a first sub-machine-learned model of the first machine-learned model based at least in part on the track, the predicted pose, the lane orientation, and the current pose or the last predicted pose, a velocity and yaw rate of the object; determining, by an integration component of the first machine-learned model and based at least in part on the velocity and the yaw rate, a probability distribution; and determining, based at least in part on determining a mean from the probability distribution, the next predicted pose.

While the example clauses described above are described with respect to one particular implementation, it should be understood that, in the context of this document, the content of the example clauses can also be implemented via a method, device, system, computer-readable medium, and/or another implementation. Additionally, any of examples A-AM may be implemented alone or in combination with any other one or more of the examples A-AM.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Such processes, or any portion thereof, may be performed iteratively in that any or all of the steps may be repeated. Of coarse, the disclosure is not meant to be so limiting and, as such, any process performed iteratively may comprise, in some examples, performance of the steps a single time.

Conditional language such as, among others, "may," "could," "may" or "might," unless specifically stated otherwise, are understood within the context to indicate that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural. When referring to a collection of items as a "set," it should be understood that the definition may include, but is not limited to, the common understanding of the term in mathematics to include any number of items including a null set (0), 1, 2, 3, . . . up to and including an infinite set.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and non-transitory memory storing processor-executable instructions that, when executed by the one or more processors, cause the system to perform operations comprising:

determining, based at least in part on sensor data, a current pose and a first predicted pose of an object in an environment in which a vehicle is operating, wherein the first predicted pose indicates a first predicted position and a first predicted orientation of the object at a first future time;

receiving a track associated with the object indicating a current and historical at least one of position, orientation, velocity, or acceleration of the object;

determining a predicted trajectory of the object based at least in part on iteratively:

determining, by a first machine-learned model, a next predicted pose of the object indicating a second predicted position and a second predicted orientation of the object at a second future time after a time associated with the current pose, wherein determining the next predicted pose by the first machine-learned model is based at least in part on the track, the first predicted pose, a lane orientation of a target pose the object is predicted to occupy at the second future time, and the current pose or a last predicted pose output by the first machine-learned model at a previous iteration; and controlling the vehicle based at least in part on the predicted trajectory of the object.

2. The system of claim 1, wherein the operations further comprise determining the lane orientation based at least in part on:

determining, by a second machine-learned model and based at least in part on the track and the current pose or the last predicted pose, the target pose, wherein the target pose indicates a location in the environment and the lane orientation.

3. The system of claim 1, wherein the operations further comprise determining the lane orientation based at least in part on:

determining a second predicted trajectory by a second machine-learned model based at least in part on the track, the current pose, and at least one of the first predicted pose or a top-down representation of the environment; and determining, based at least in part on the second predicted trajectory, a nearest target pose to a portion of the second predicted trajectory at the second future time, wherein:

the nearest target pose is the target pose, the nearest target pose is determined from among multiple target poses, and the nearest target pose indicates a location in the environment and the lane orientation.

4. The system of either claim 1 or 2, wherein training the first machine-learned model and the second machine-learned model comprises:

determining, based at least in part on the sensor data received from the time associated with the current pose to a time associated with the first future time, an observed path of the object;

determining a loss based at least in part on a difference between the predicted trajectory and the observed path; and altering at least one of a first parameter of the first machine-learned model or a second parameter of the second machine-learned model to reduce the loss.

5. The system of claim 1, wherein determining the first predicted pose comprises:

determining, based at least in part on the sensor data, a top-down representation of the environment, the top-down representation including a detection of the object in the environment;

determining, by a second machine-learned model and based at least in part on the track and at least a portion of the top-down representation, a second target pose from among multiple target poses, the second target pose indicating a second position in the environment and a second lane orientation of a lane associated with the second target pose; and determining, by a third machine-learned model based at least in part on the second target pose, the track, and at least the portion of the top-down representation, the first predicted pose, the first predicted pose determined based on at least one of a longitudinal offset from the second position, a lateral offset from the second position, or an angular offset from the second lane orientation determined by the second machine-learned model.

6. The system of claim 1, wherein determining the next predicted pose comprises:

determining, by a first sub-machine-learned model of the first machine-learned model based at least in part on the track, the predicted pose, the lane orientation, and the current pose or the last predicted pose, a velocity and yaw rate of the object;

determining, by an integration component of the first machine-learned model and based at least in part on the velocity and the yaw rate, a probability distribution; and determining, based at least in part on determining a mean from the probability distribution, the next predicted pose.

7. The system of claim 1, wherein determining the next predicted pose by the first machine-learned model is based at least in part on a second lane orientation of a second target pose nearest to the last predicted pose instead of the lane orientation of the target pose the object is predicted to occupy at the second future time.

8. One or more non-transitory computer-readable media comprising processor-executable instructions that, when executed by one or more processors, cause the one or more processors to perform operations comprising:

determining, based at least in part on sensor data, a current pose and a first predicted pose of an object in an environment in which a vehicle is operating;

receiving a track associated with the object indicating a current and historical at least one of position, orientation, velocity, or acceleration of the object;

determining a predicted trajectory of the object based at least in part on:

determining, by a first machine-learned model based at least in part on the track, a next predicted pose of the object indicating a third predicted position and a second predicted orientation of the object at a first future time, wherein determining the next predicted pose by the first machine-learned model is based at least in part on the first predicted pose, a second predicted pose output by the first machine-learned model associated with a second future time before the first future time, and a lane orientation of a target pose nearest the second predicted pose; and controlling the vehicle based at least in part on the predicted trajectory of the object.

9. The one or more non-transitory computer-readable media of claim 8, wherein the operations further comprise determining the lane orientation based at least in part on:

determining, by a second machine-learned model and based at least in part on the track and the current pose or a last predicted pose, the target pose, wherein the target pose indicates a location in the environment and the lane orientation.

10. The one or more non-transitory computer-readable media of claim 8, wherein determining the next predicted pose by the first machine-learned model is further based at least in part on a second lane orientation of a second target pose the object is predicted to occupy at the first future time.

11. The one or more non-transitory computer-readable media of claim 10, wherein the operations further comprise determining the second lane orientation based at least in part on:

determining a second predicted trajectory by a second machine-learned model based at least in part on the track, the current pose, and at least one of the first predicted pose or a top-down representation of the environment; and determining, based at least in part on the second predicted trajectory, a second nearest target pose to a portion of the second predicted trajectory at the first future time, wherein:

the second nearest target pose is the target pose, the second nearest target pose is determined from among multiple target poses, and the second nearest target pose indicates a location in the environment and the second lane orientation.

12. The one or more non-transitory computer-readable media of claim 8, wherein determining the first predicted pose comprises:

determining, based at least in part on the sensor data, a top-down representation of the environment, the top-down representation including a detection of the object in the environment;

determining, by a second machine-learned model and based at least in part on the track and at least a portion of the top-down representation, a second target pose from among multiple target poses, the second target pose indicating a second position in the environment and a second lane orientation of a lane associated with the second target pose; and determining, by a third machine-learned model based at least in part on the second target pose, the track, and at least the portion of the top-down representation, the first predicted pose, the first predicted pose determined based on at least one of a longitudinal offset from the second position, a lateral offset from the second position, or an angular offset from the second lane orientation determined by the second machine-learned model.

13. The one or more non-transitory computer-readable media of claim 8, wherein determining the next predicted pose comprises:

determining, by a first sub-machine-learned model of the first machine-learned model based at least in part on the track, the predicted pose, the lane orientation, and the current pose or the predicted pose, a velocity and yaw rate of the object;

determining, by an integration component of the first machine-learned model and based at least in part on the velocity and the yaw rate, a probability distribution; and determining, based at least in part on determining a mean from the probability distribution, the next predicted pose.

14. A method comprising:

determining, based at least in part on sensor data, a current pose and a first predicted pose of an object in an environment in which a vehicle is operating;

receiving a track associated with the object indicating a current and historical at least one of position, orientation, velocity, or acceleration of the object;

determining a predicted trajectory of the object based at least in part on:

determining, by a first machine-learned model based at least in part on the track, a next predicted pose of the object indicating a third predicted position and a second predicted orientation of the object at a first future time, wherein determining the next predicted pose by the first machine-learned model is based at least in part on the first predicted pose, a second predicted pose output by the first machine-learned model associated with a second future time before the first future time, and a lane orientation of a target pose nearest the second predicted pose; and controlling the vehicle based at least in part on the predicted trajectory of the object.

15. The method of claim 14, further comprising determining the lane orientation based at least in part on:

determining, by a second machine-learned model and based at least in part on the track and the current pose or a last predicted pose, the target pose, wherein the target pose indicates a location in the environment and the lane orientation.

16. The method of claim 14, wherein determining the next predicted pose by the first machine-learned model is further based at least in part on a second lane orientation of a second target pose the object is predicted to occupy at the first future time.

17. The method of claim 16, further comprising determining the second lane orientation based at least in part on:

determining a second predicted trajectory by a second machine-learned model based at least in part on the track, the current pose, and at least one of the first predicted pose or a top-down representation of the environment; and determining, based at least in part on the second predicted trajectory, a second nearest target pose to a portion of the second predicted trajectory at the first future time, wherein:

the second nearest target pose is the target pose, the second nearest target pose is determined from among multiple target poses, and the second nearest target pose indicates a location in the environment and the second lane orientation.

18. The method of claim 14, wherein determining the first predicted pose comprises:

determining, based at least in part on the sensor data, a top-down representation of the environment, the top-down representation including a detection of the object in the environment;

determining, by a second machine-learned model and based at least in part on the track and at least a portion of the top-down representation, a second target pose from among multiple target poses, the second target pose indicating a second position in the environment and a second lane orientation of a lane associated with the second target pose; and determining, by a third machine-learned model based at least in part on the second target pose, the track, and at least the portion of the top-down representation, the first predicted pose, the first predicted pose determined based on at least one of a longitudinal offset from the second position, a lateral offset from the second position, or an angular offset from the second lane orientation determined by the second machine-learned model.

19. The method of claim 14, wherein determining the next predicted pose comprises:

determining, by a first sub-machine-learned model of the first machine-learned model based at least in part on the track, the predicted pose, the lane orientation, and the current pose or a predicted pose, a velocity and yaw rate of the object;

determining, by an integration component of the first machine-learned model and based at least in part on the velocity and the yaw rate, a probability distribution; and determining, based at least in part on determining a mean from the probability distribution, the next predicted pose.

* * * * *